(12) United States Patent
Galstian et al.

(10) Patent No.: US 7,859,640 B2
(45) Date of Patent: Dec. 28, 2010

(54) METHOD AND APPARATUS FOR SPATIALLY MODULATED ELECTRIC FIELD GENERATION AND ELECTRO-OPTICAL TUNING USING LIQUID CRYSTALS

(75) Inventors: Tigran Galstian, Quebec (CA);
Vladimir Presniakov, Quebec (CA);
Karen Asatryan, Quebec (CA)

(73) Assignee: Universite Laval, Quebec, Quebec (CA)

( * ) Notice: Subject to any disclaimer, the term of this patent is extended or adjusted under 35 U.S.C. 154(b) by 793 days.

(21) Appl. No.: 11/682,266

(22) Filed: Mar. 5, 2007

(65) Prior Publication Data

US 2007/0229754 A1    Oct. 4, 2007

Related U.S. Application Data

(60) Provisional application No. 60/778,380, filed on Mar. 3, 2006.

(51) Int. Cl.
*G02F 1/13* (2006.01)

(52) U.S. Cl. ................... 349/200; 349/201; 349/202

(58) Field of Classification Search ......... 349/200–202; 359/666
See application file for complete search history.

(56) References Cited

U.S. PATENT DOCUMENTS

| | | | |
|---|---|---|---|
| 5,066,109 A | 11/1991 | Kuratate et al. | |
| 5,313,562 A | 5/1994 | Wiltshire | |
| 6,859,333 B1 | 2/2005 | Ren et al. | |

2004/0218259 A1    11/2004  Hui et al.

FOREIGN PATENT DOCUMENTS

| | | |
|---|---|---|
| JP | 01005988 A2 | 4/1989 |
| JP | 06289064 A2 | 10/1998 |
| JP | 2006-145957 | 6/2006 |
| WO | 2004059565 | 7/2004 |

OTHER PUBLICATIONS

Mao YE, Bin Wang, Maki Yamaguchi, and Susumu Sato; Reducing Driving Voltages for Liquid Crystal Lens Using Weakly Conductive Thin Film; Japanese Journal of Applied Physics vol. 47, No. 6, 2008, pp. 4597-4599..

(Continued)

*Primary Examiner*—Hoan C Nguyen
(74) *Attorney, Agent, or Firm*—Anglehart et al.

(57) ABSTRACT

A variable optical device for controlling the propagation of light has a liquid crystal layer (1), electrodes (4) arranged to generate an electric field acting on the liquid crystal layer, and an electric field modulation layer (3,71) arranged between the electrodes and adjacent the liquid crystal layer for spatially modulating said electric field in a manner to control the propagation of light passing through said optical device. The electric field modulation layer has either an optical index of refraction that is essentially spatially uniform, or a polar liquid or gel, or a very high low frequency dielectric constant material having a dielectric constant greater than 20, and preferably greater than 1000. The modulation layer can have a solid body having a first low frequency dielectric constant with a shape selected to impart a desired modulation of the electric field, and a second low frequency dielectric constant material surrounding or adjacent to the solid body such that the solid body and the second material form a layer geometry.

9 Claims, 19 Drawing Sheets

OTHER PUBLICATIONS

M. Ye. B. Wang and S. Sato; Realization of liquid crystal lens of large aperture and low driving voltages using thin layer of weakly conductive material; 1Akita Research Institute of Advanced Technology, Akita Prefectural R & D Center, 4-21 Sanuki, Araya, Akita 010-1623, Japan 2Department of Electrical and Electronic Engineering, Akita University, 1-1 Tegatagakuen-cho, Akita 010-8502, Japan.

Wang, B., Lens of electrically controllable focal length made by a glass lens and liquid-crystal layers, Applied Optics, Jun. 10, 2004, 3420-3425, vol. 43, No. 17, XP-002401461, Japan.

EPO Standard Search Report regarding U.S. Appl. No. 60/778,380, report dated Oct. 3, 2006.

PCT International Search Report dated Apr. 2007, regarding PCT/CA2007/000335 corresponding to the present application.

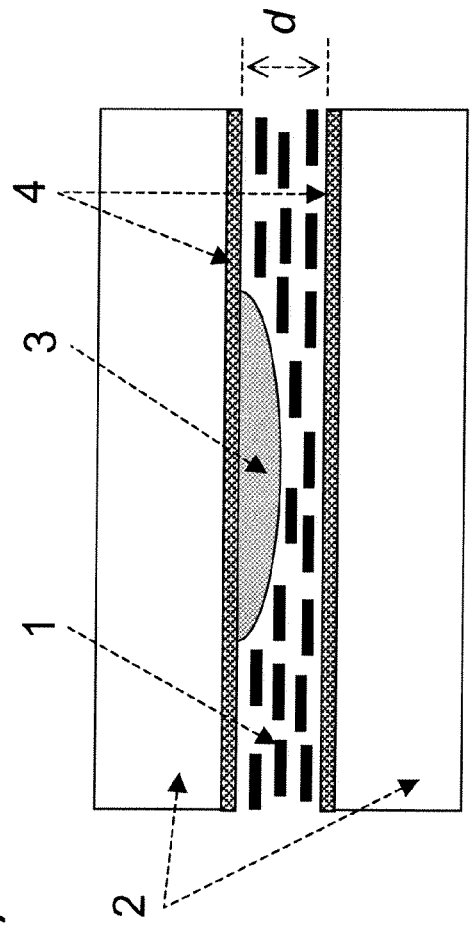
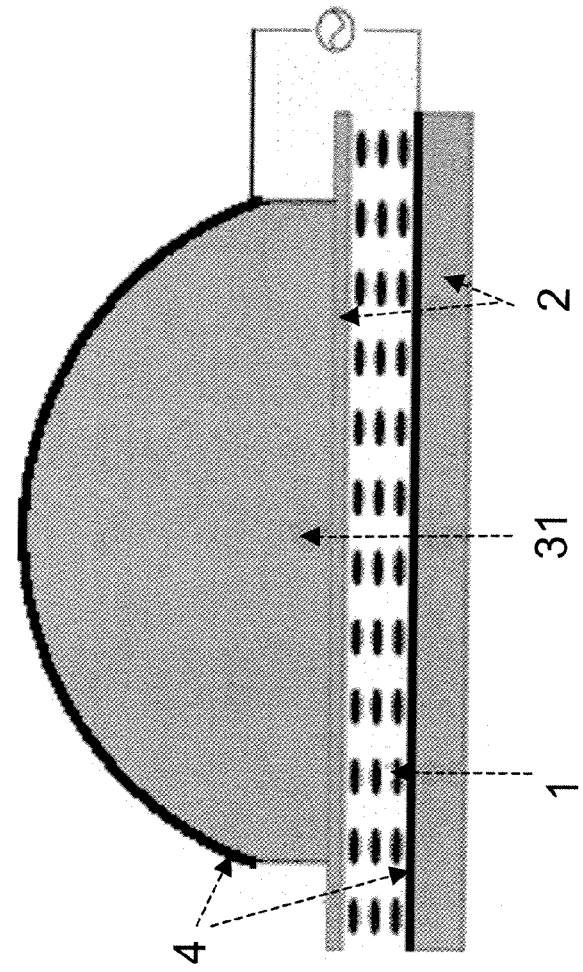
Fig.1 a (PRIOR ART)
Fig.1 b (PRIOR ART)

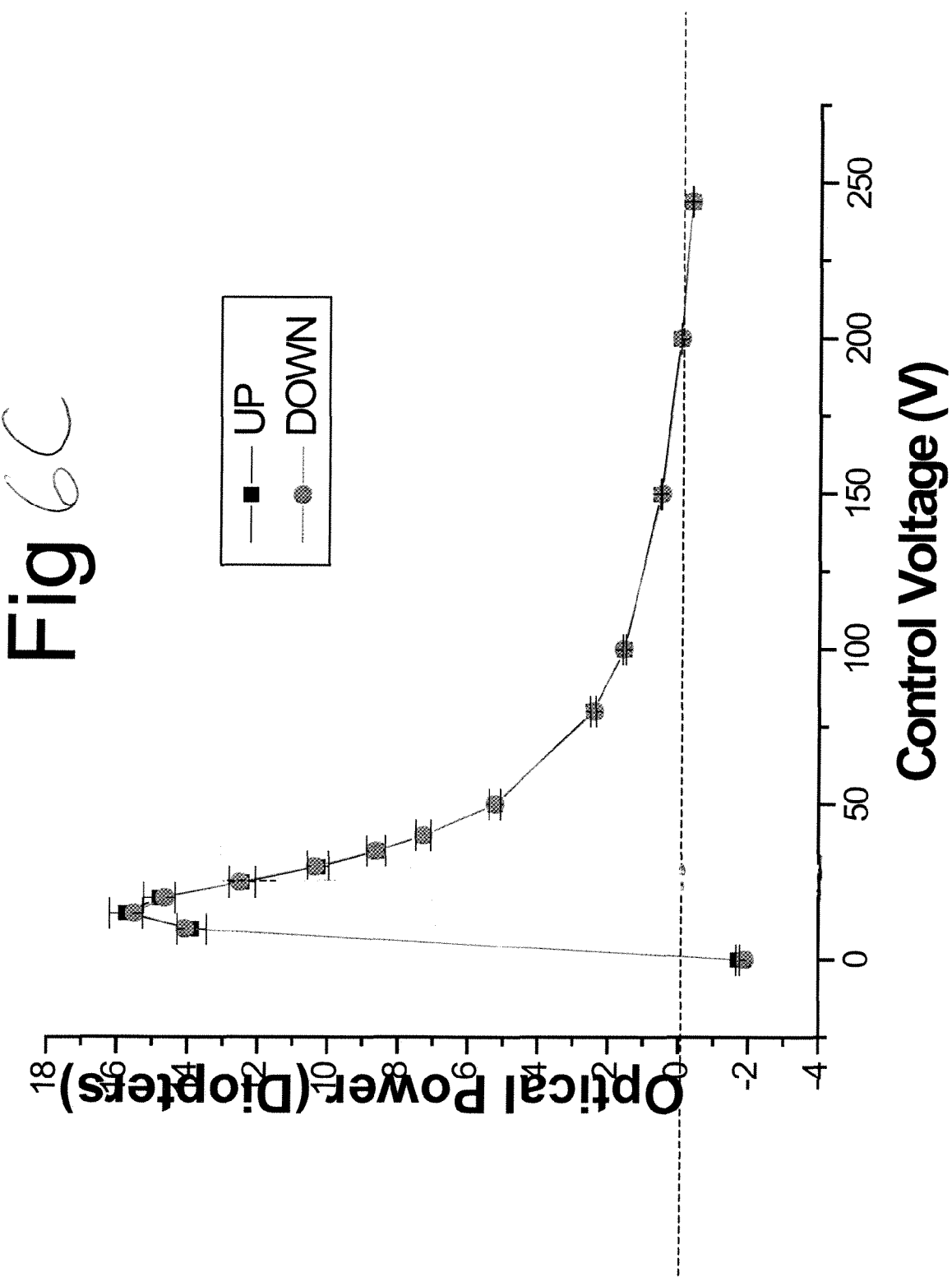

Fig.7
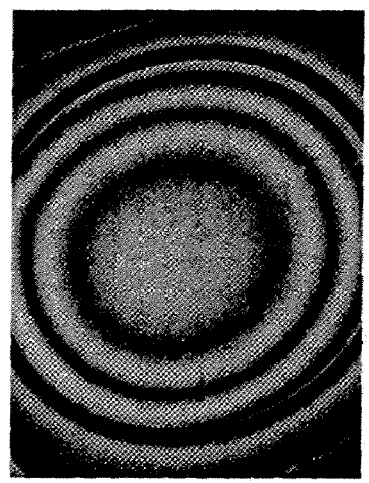
U = 67 V
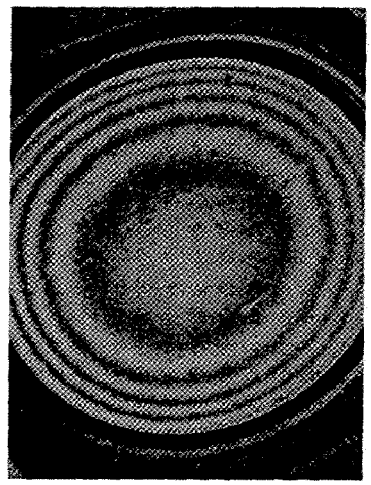
U = 17.4 V
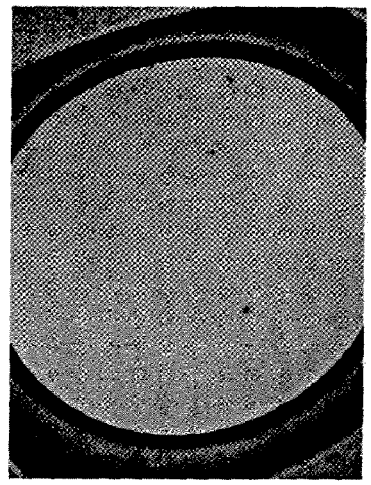
U = 0 V

Fig.8 — Image correction by LC tunable lens

FIG.13
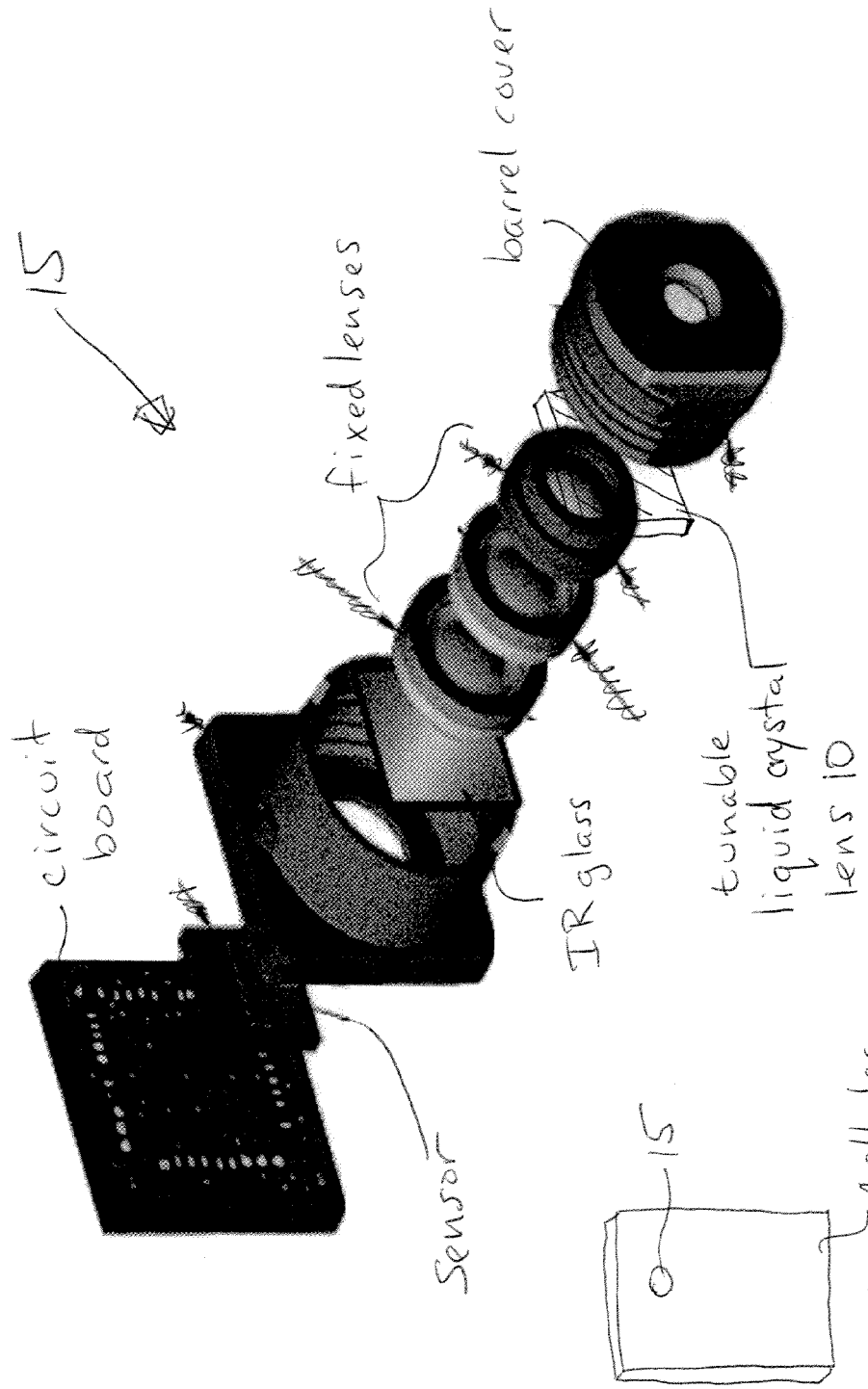
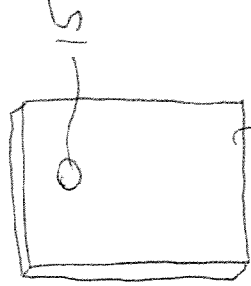
Fig.14

METHOD AND APPARATUS FOR SPATIALLY MODULATED ELECTRIC FIELD GENERATION AND ELECTRO-OPTICAL TUNING USING LIQUID CRYSTALS

TECHNICAL FIELD

The present invention relates to electrically controllable optical devices and, in particular, to a method and apparatus for creation of spatially non uniform electric field and its use in electro optical tuning of optical properties of refractive and diffractive optical elements using liquid crystals (LC).

BACKGROUND OF THE INVENTION

As is well known in the art, the successful implementation of intelligent (self-adjustable) optical imaging systems requires devices capable of controllably changing their optical properties. One of the most important optical functions required to be adjustable is the focusing capacity and the focusing distance. Those properties are essential, for example, for the manufacturing of high quality cell phone cameras, storage/reading systems, adjustable glass of contact and other vision systems.

In modern high performance optical imaging systems the optical zoom is obtained by the use of a mechanical movement. This implies that those imaging systems are relatively big (to accommodate, e.g., a step motor), heavy and generally have a slow zoom (at the order of second).

Several approaches have been explored to replace the electro mechanical zoom. A variable-focus liquid lens has been demonstrated using changing aperture [H. Ren, S-T Wu, Variable-focus liquid lens by changing aperture, Appl. Phys. Lett., v. 86, 211107, 2005]. Electro wetting effect in conductive immiscible liquids has been also used to obtain focus tuning [S. Kuiper, B. H. W. Hendriks, Variable-focus liquid lens for miniature cameras, Appl. Phys. Letters, V. 85, No. 7, 1128, 2004]. However in both approaches the variable voltage, delivered to the cell, causes mechanical changes of the shape. So even, if there are no free-space distinct moving components, the focus variation is still based on the mechanical movement. This is highly undesirable since the operation of such systems is vulnerable to environmental vibrations and temperature changes.

It is well known that LCs may provide huge electrically controlled refractive index changes [L. M. Blinov, V. G. Chigrinov, Electrooptic effects in Liquid Crystal Materials, Springer-Verlag, N.Y. 459 pp, 1994.]. However, the focus tuning (which is required for optical zoom) requires the generation of spatially varying refractive index changes in LCs. This, in turn, usually requires either a spatially non uniform LC layer (for example, a lens that is submerged in the LC cell or a gradient polymer network stabilized LC [V. V. Presnyakov, K. E. Asatryan, and T. Gaistian, A. Tork, Tunable polymer-stabilized liquid crystal microlens, Optics Express, Vol. 10, No. 17, Aug. 26, pp. 865-870, 2002]) or a spatially varying electric field.

A schematic representation of a spatially non-uniform LC layer is shown in the FIG. 1a (PRIOR ART), [L. G. Commander, S. E. Day, D. R. Selviah, Variable focal length microlenses, Optics Communications, V. 177, pp. 157-170, 2000] where the LC (1) is sandwiched between two transparent glass substrates (2) covered by uniform transparent electrodes (4). The substrates (2) are separated by a gap of a thickness d filled with LC. Inside the LC cell there is a transparent optical material (3) of hemispherical profile with refractive index $n_m$. The effective index of refraction $n_{\it eff}$ of the LC (defined by the orientation of its director n that is the average direction of long molecular axes) may be changed with respect to $n_m$ by applying an electric voltage V across the LC layer. The relative contrast of refractive index $n_{\it eff}(V)$-$n_m$ may thus be changed resulting in a change of focal distance F(V) of the whole system. However, the LC orientation being typically obtained by mechanical rubbing, this method is very difficult to apply in industrial manufacturing. Also disclination lines are easily appearing upon the application of electric voltage. These are the reasons why we shall not analyze further such solutions.

Another method of obtaining non-uniform LC orientation is the introduction of non uniform polymer network that is stabilizing the LC matrix [T. Galstian, V. Presniakov, A. Tork, K. Asatryan, Electrically variable focus polymer-stabilized liquid crystal lens, U.S. patent application publication No. 20050018127-A1]. However, relatively high light scattering (due to small-size non uniform LC reorientation) makes this method less interesting for practical applications.

The simplest (not from the manufacturing point of view) method of obtaining a spatially varying electric field is the use of multiple (more than 2) transparent electrodes (such as Indium Tin Oxide/ITO) distributed on the LC cell substrates. [S. T. Kowel, P. G. Kornreich, D. S. Cleverly, Adaptive liquid crystal lens, U.S. Pat. No. 4,572,616, 1986 (filed Aug. 1982)] and [ N. A. Riza, M. C. DeJule, Three-terminal adaptive nematic liquid-crystal lens device, Opt. Lett. 19, pp. 1013-1015, 1994.] However, the fabrication of such structures requires sub-micrometer precision, their electrical driving requires rather complex electronic micro processing and their operation is degraded by light diffraction and scattering.

Combination of planar and curved electrodes has been described in Ref. [Liquid Crystal Lens with Spherical Electrode, B. Wang, M. Ye, M. Honma, T. Nose, S. Sato, Jpn. J. Appl. Phys. Vol. 41(2002), pp. L1232-L1233, Part 2, No. 11A, 1 Nov.], which allows the use of standard (transparent) electrodes and LC cells having two planar internal surfaces (FIG. 1b, PRIOR ART). The non uniform (centrally symmetric) electric field is obtained thanks to the geometrical lens-like form (31) of the "external" curved surface which is coated by the upper electrode (4). In fact, the planar LC (1) layer is sandwiched between two glass substrates (2). The planar ITO electrode is coated on the bottom (plane) surface of one substrate, while the second electrode is fabricated on the top of the curved zone (31). Such structure is difficult to fabricate and has a 0-voltage lensing property (what we call "action-at-0-voltage"), which may cause problems if an unexpected voltage failure happens.

This 0-voltage lensing may be eliminated by using an additional polymer layer that is placed over the curved and ITO-coated surface and which has flat upper surface [H. Ren, Y. H. Fan, S. Gauza, S. T. Wu, Tunable-focus flat liquid crystal spherical lens, Applied Phys. Lett., V. 84, No. 23, pp. 4789-4791, (2004).]. This approach, in fact, allows to permanently "hidden" the 0-voltage lensing effect (providing "no-action-at-0-voltage") while its fabrication remains complicated and costly.

Similar solution has been described in Ref. [ U.S. Pat. No. 6,859,333: H. Ren, Y.-H Fan, S.-T. Wu "Adaptive liquid crystal lenses", Feb. 2005, filled Jan. 2004)] for the fabrication of diffractive tunable lenses. This is an adaptive optical lens device composed of at least two planar substrates and at least one homogeneous nematic liquid crystal (NLC) layer. One planar substrate has a spherical or annular ring-shaped Fresnel grooved transparent electrode within it, the other has a transparent electrode coated on its inner surface. The thickness of the NLC layer is uniform. When a voltage is applied across the LC layer, a centro-symmetrical gradient distribution of refractive index within LC layer occurs. Therefore, the LC layer causes light to focus. By controlling the applied voltage, the focal length of the lens is continuously tunable.

While the flat internal surfaces of the LC cell are easier to fabricate, the complex-curved geometry of "external" surfaces and the electrode deposition on those surfaces make difficult the fabrication of such lenses.

Various geometrical solutions have been proposed to avoid the use of multiple and complex electrodes. One of them is based on the use of a two-dimensional geometrical form of electrodes. For example, hole patterned electrode has been used in Refs. [M. Ye, S. Sato, Jpn. J. Appl. Phys., V. 41, (2002), L571; U.S. Pat. No. 6,768,536: D. Okuwaki, S. Sato "Liquid crystal microlens" Jul. 2004, filled Nov. 2002);] and in Ref. [B. Wang, M. Ye, S. Sato, *Liquid-crystal lens with stacked structure of liquid-crystal layers*, Optics Communications, 250 (2005), pp. 266-273]. The basic idea of this approach is described in the FIG. 2*a* (PRIOR ART). This is a rather standard cell with LC (1) sandwiched between two substrates (2) and one of substrates (the bottom one) is coated by an ITO (4). However, there is a hole (5) in the upper electrode (41). The application of the voltage between (4) and (41) generates a centrally symmetric electric field (42), which reorients the LC director n in a spatially nonuniform (centrally symmetric) way. This, in turn, generates $n_{eff}(V,x)$ that has a corresponding form in the space x. The main drawback of this structure is the necessity to use very thick LC layers (large d) to be able to obtain the desired spatial profile of the electric field in the LC layer and maintain good optical quality of the lens (particularly to avoid optical aberrations).

An improved version of this approach ([B. Wang, M. Ye, S. Sato, *Liquid-crystal lens with stacked structure of liquid-crystal layers*, Optics Communications, 250 (2005), pp. 266-273], see FIG. 2*b*, PRIOR ART.) contains multiple transparent substrates (2), a pair of uniform transparent electrodes provided on the bottom side of the upper substrate (40) and on the upper surface of the lower substrate (4). An intermediate electrode (41) with a circular hole (5) is introduced between those electrodes (4). To obtain an acceptable lens-like refractive index gradient (for low aberrations) and disclination-free LC reorientation, the distance between the hole patterned electrode (41) and the uniform electrode 4 must be more than 500-1300 um (for lenses with 4-5 mm of diameter), which leads to the necessity of high voltages. The LC generates a lens-like structure when first high and fixed auxiliary voltage $V_0$ (at the order of 150 V) and then a control voltage $V_c$ (at the order of 175 V) are applied simultaneously (between the electrode 4 and electrodes 41 and 40, respectively). Then, after a certain optimal delay T the control voltage $V_c$ is decreased to the desired value). High voltages and complex dynamics required make this method rather difficult to implement in practice. Complex, multiple cell solutions based on the same approach are increasing the manufacturing cost and driving complexity.

So-called "Modal-controlled" liquid crystal lens has been demonstrated in Ref. [A. F. Naumov, M. Yu. Loktev, I. R. Guralnik, G. Vdovin, "*Liquid-crystal adaptive lenses with modal control*", Opt. Lett. 23, 992-994, 1998; G. D. Love, A. F. Naumov, "Modal liquid crystal lenses", Liq. Cryst. Today, 10(1), pp. 1-4, 2000; M. Yu. Loktev, V. N. Belopukhov, F. L. Vladimirov, G. V Vdovin, G. D. Love, A. F. Naumov, Wave front control systems based on modal liquid crystal lenses, Review of Scientific Instruments, V. 71, No. 9, pp. 3290-3297, (2000).]. High resistance annular electrode (40) is used here (FIG. 2*c*, PRIOR ART) in contrast to the previous hole-patterned electrode. The voltage is applied between the uniform electrode (4) of the bottom substrate and the annular electrode (40) of the upper substrate. Thanks to the complex impendence, formed by the highly resistant electrode (40) and the LC layer (1), the distribution of the rms voltage (and corresponding control field (42) and (43)) across the cell is centrally symmetric but non-uniform (with a center coinciding with the center of the electrode 40). The fields (42) and (43) are described by Bessel functions, and the voltage-optical retardance dependency is approximately an inversion logarithmic function. The problems of this approach are the strong light absorption by the highly resistant electrode (40), the optical aberrations (since, if a voltage of arbitrary magnitude and phase is applied to the cell, then the resulting phase distribution will be far from parabolic) and complexity of the electrical control (voltage and frequency).

In contrast with all previous examples (where the non uniform electric field is obtained by the use of geometrical form of curved or hole patterned electrodes or via the impedance induced gradient), an elegant solution was proposed, which uses the gradient of the dielectric permittivity of materials at low frequency (e.g., 1 kHz) electric field $\in_{DC}$ (here called "DC" to note the driving electric field). Namely, an intermediate layer (3) is inserted between two control electrodes (4) to generate the desired gradient of the driving electric field [B. Wang, M. Ye, S. Sato, Lens of electrically controllable focal length made by a glass lens and liquid crystal layers, Applied Optics, V. 43, No. 17, pp. 3420-3425, 2004.], FIG. 3 (PRIOR ART). In fact, the intermediate layer (3) is composed of glass (with $\in^{(g)}_{DC}$) and has spatially non uniform thickness. The remaining part (7) of the intermediate space is filled by air, with $\in^{(a)}_{DC} \approx 1$. The application of the low frequency electric voltage (through electrodes 4) generates a spatially non uniform electric field inside the LC cell, because of the non-uniformity of the dielectric permittivity of the intermediate media $\in^{(g)}_{DC} > \in^{(a)}_{DC}$. The electric field 43 in the central part of the cell will thus be different (weaker) from the electric field 42 near to the border. In the particular case of FIG. 3 (PRIOR ART) two LC cells are used to enhance the effect. The advantage of this approach is that the desired spatial form (gradient) may be obtained by the use of the intermediate material of appropriate form (such as a lens).

However, three major problems remain to be solved in this approach too. One of them is the inherent 0-voltage lensing effect ("action-at-0-voltage"). The second problem is related to the necessity of having multiple antireflection coatings to avoid high optical losses of this geometry due to Fresnel reflections on multiple glass-air surfaces (since at optical frequencies the refractive index is quite different for glass $n_g \approx 1.5$ and air $n_a \approx 1$). Finally, the achievable contrast of electric field (and thus of the $n_{eff}(V,x)$) is severely limited because of the maximum achievable contrast between $\in^{(g)}_{DC}$ (which can be varied from 3.8 to 14.5 depending on the type of glass) and $\in^{(a)}_{DC} \approx 1$ (in fact, one could use a high n material lens, but it would generate significant Fresnel losses).

Accordingly, low loss, efficient and electrically tunable focal optical devices remain highly desirable.

SUMMARY OF THE INVENTION

Accordingly, an object of the present invention is to provide a method and apparatus for creation of spatially non uniform electric field using uniform electrodes and planar (standard) LC cells and its use to generate electro optical tuning of focusing properties of refractive and diffractive optical elements using liquid crystals (LC), in which the devices have low losses, and a simple construction and/or manufacture. In some embodiments, there is provided a method and apparatus for creation of such devices having efficient control and allowing a "no-action-at-0-voltage" operation.

In the first aspect of the present invention we propose an architecture which, at first view, would seem illogical. To illustrate the non obviousness of our proposition we shall use the previous geometry only as an example, FIG. 4).

We propose (and implement our proposition in experiment, see later) to fill the remaining space (between the LC cells and the intermediate glass 3) by a specific material (71). An example of such a material may be a water based solution with low-frequency dielectric permittivity $\in^{(s)}{}_{DC}$ and high (optical) frequency refractive index $n_s$. It is well known in the art that, due to the specific dipolar molecular character, the water has a huge $\in^{(s)}{}_{DC}$ (at the order of 78) and, in the meantime, rather low $n_s$ (at the order of 1.33). Thus, by using an intermediate material (3) having $n^{(3)} = n_s$ one can also provide the "no-action-at-0-voltage" property. An example of such material may be the fluorinated polymer (typically having very low $n_p$) of an appropriate geometrical form and size (see later). Thus, at optical frequencies there will be planar uniformity providing "no-action-at-0-voltage". In addition there will be no additional Fresnel reflections and optical losses. In the meantime, there will be extra-ordinarily large contrast of dielectric permittivity at low frequency fields (used for control).

In some embodiments of the invention, there is provided a variable optical device for controlling the propagation of light, in which the optical device comprises a liquid crystal layer, electrodes arranged to generate an electric field acting on said liquid crystal layer, and an electric field modulation layer arranged between said electrodes and adjacent said liquid crystal layer for spatially modulating said electric field in a manner to control the propagation of light passing through said optical device. In some embodiments, the electric field modulation layer comprises an optical index of refraction that is essentially spatially uniform. In others, the electric field modulation layer comprises a polar liquid or gel. And still in others, the electric field modulation layer comprises a very high low frequency dielectric constant material having a dielectric constant greater than 20, and preferably greater than 1000.

In some embodiments, the thin liquid crystal lens is incorporated into a mobile telephone camera system.

Manufacture of the lens can be made easier by using planar geometry for the liquid crystal layer and even for the electric field modulation layer.

BRIEF DESCRIPTION OF THE DRAWINGS

Further features and advantages of the present invention will become apparent from the following detailed description, taken in combination with the appended drawings, in which:

FIG. 1*a* schematically illustrates principal elements of a prior art tunable lens using non-uniform LC layer;

FIG. 1*b* schematically illustrates principal elements of a prior art tunable lens using a uniform LC layer, but a non uniform external substrate with 0-voltage lensing effect;

FIG. 6C illustrates a plot of optical power of a tunable lens as a function of voltage, expressing graphically the information of FIG. 6B.

FIG. 7 illustrates the micro-photography of experimentally obtained spatially non-uniform phase delay rings using the sample of FIG. 5 at three chosen voltages of 0, 17.4 and 67V.

FIG. 13 illustrates a cross-section side view of a mobile telephone incorporating a variable focus liquid crystal lens according to one embodiment of the invention, in which the mounting of the camera system's CCD or CMOS imaging chip on the circuit board, along with the liquid crystal lens, other fixed lenses and external housing are shown; and FIG. 14 illustrates a mobile telephone including the tunable liquid crystal lens according to FIG. 13.

DETAILED DESCRIPTION OF THE PREFERRED EMBODIMENT

Figure 2:
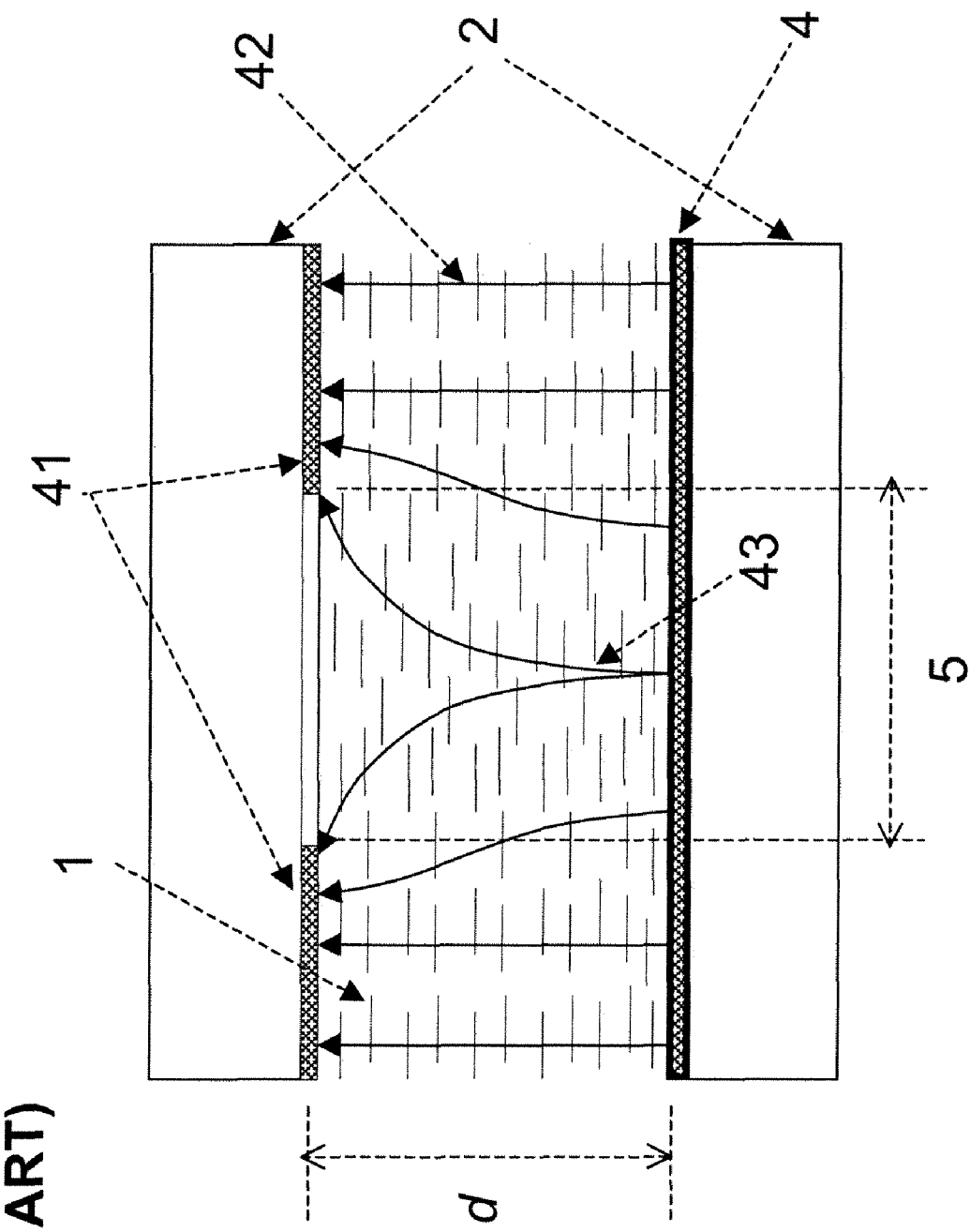
FIG. 2*a, b, c* schematically illustrate principal elements of prior art tunable lenses using a uniform LC layer and uniform substrates, but non uniform hole-patterned (a) two and (b) tree control electrodes and (c) circular control electrode.
Figure 2:
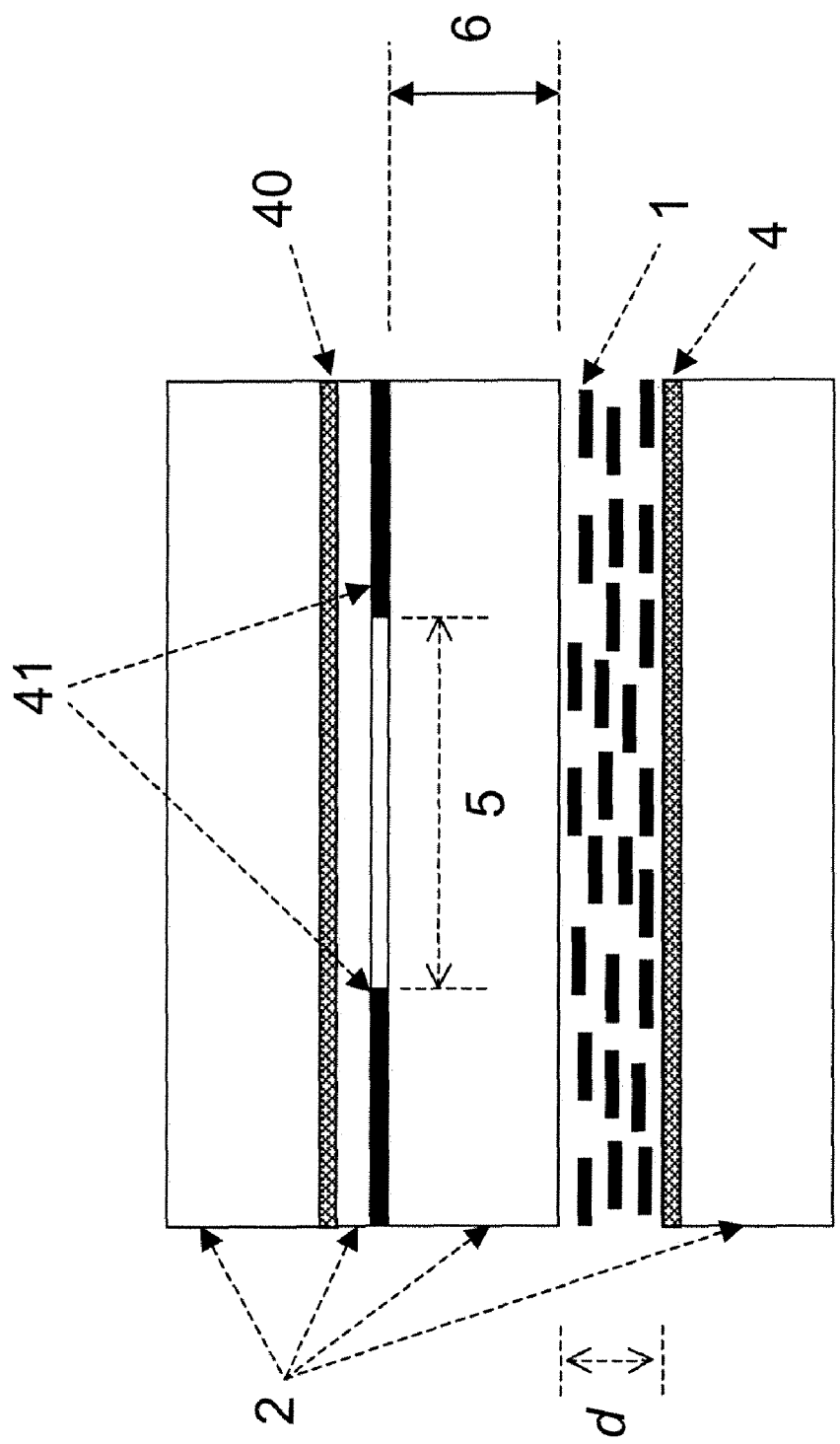
Figure 2:
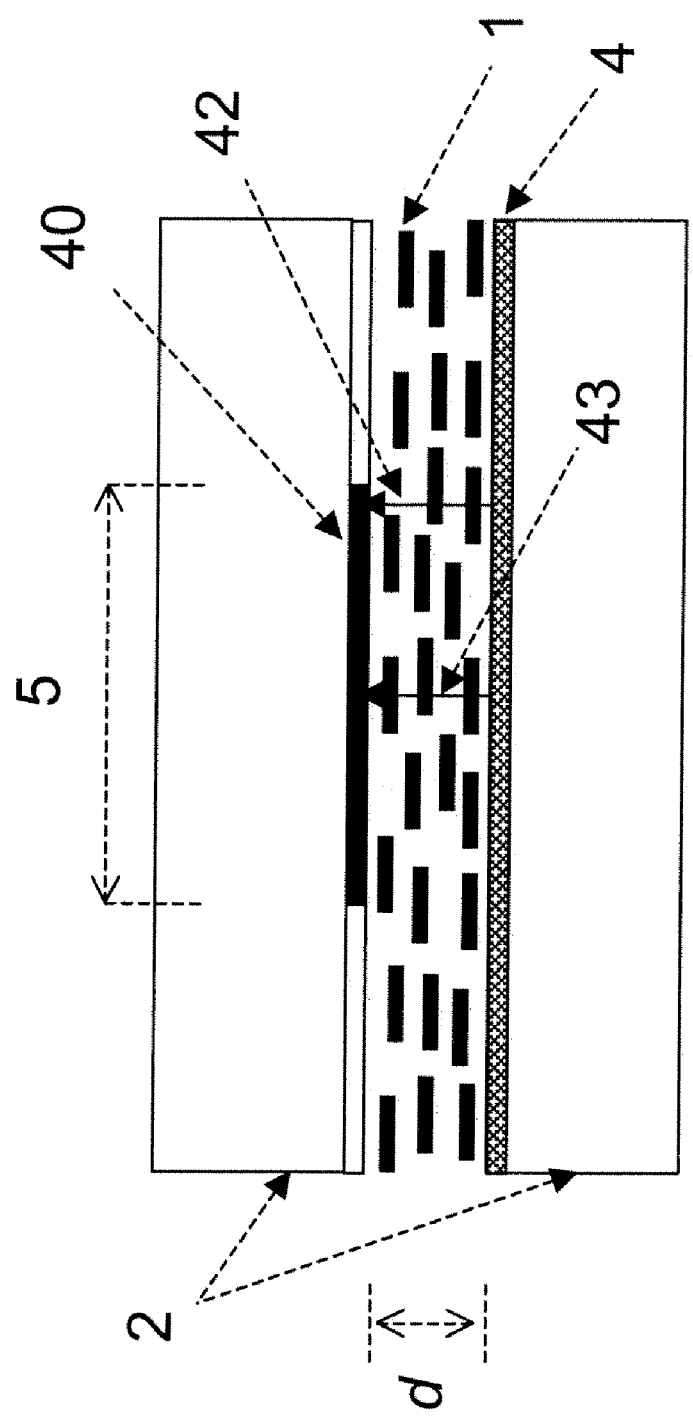

The present invention provides a method to generate a spatially non-uniform electric field by uniform electrodes and devices that use this method for controlling propagation of light. The devices of the present invention may be used for tunable focusing, diffracting, steering, etc.

For the sake of brevity, the following description will focus on simple refractive and diffractive structures, while other types of structures and more complex combinations of elements may equally be used. Similarly, embodiments using static or electro-optic materials will be described, it being understood that other materials may be used instead to obtain the same goal, which is low loss, high efficiency operation, and in some embodiments, a "no-action-at-0-voltage" property.

Referring to FIG. 1a, we show a prior art lens, where the LC (1) is sandwiched between two glass substrates (2) with transparent electrodes (4). A non-uniform profile element (3) is immersed in the LC layer to obtain the spatially uniform modulation of the refractive index of the device. We believe that it is very difficult to create and control such a tunable lens.

Referring to FIG. 1b, we show a prior art lens, where the LC (1) is sandwiched between two glass substrates (2) with transparent electrodes (4). A uniform LC layer is used here as opposed to the previous case. However a non-uniform profile element (31) is used on the top substrate, which is covered by a transparent electrode (4) deposed on the curved surface (31). This allows obtaining the spatially uniform modulation of the refractive index of the device. However, we believe that it is very difficult to create and control such a tunable lens and, in addition, such a device has an obligatory "action-at-0-voltage" operation.

Referring to FIG. 2a, we show a prior art lens, where the uniform LC layer (1) is sandwiched between two glass substrates (2) separated at distance d. Two transparent electrodes are used to drive the device. The bottom electrode (4) is uniform, while the top electrode (41) has a hole in the middle of diameter (5). The combination of uniform and non-uniform electrodes allows generating spatially non uniform electric field that is different at the border (42) and in the central part (43) of the cell. This generates a corresponding spatially non-uniform director reorientation and light focusing. However to avoid strong aberrations a very thick LC layer must be used which increases significantly the driving voltage and time of switching (10s of seconds).

Referring to FIG. 2b, we show a prior art lens, where the previous approach (FIG. 2a) is modified to avoid the use of a thick LC layer. An additional uniform electrode (40) is used on the top of the hole-patterned electrode (41). These electrodes are isolated from each other by an additional intermediate glass layer (2). Also, an additional glass layer of thickness (6) is introduced between the hole-patterned electrode (41) and the LC layer (1) that provides the required field form in the LC layer. However, to avoid strong disclinations, a very complex dynamic excitation is used (first applying voltage between electrodes (4) and (41) and then applying another tension between electrodes (4) and (40). This strongly complicates the control circuitry, and the required voltages are very high (150-170V).

Referring to FIG. 2c, we show a prior art lens, where the LC (1) is sandwiched between two glass substrates (2) with transparent electrodes (4) and (40). The particularity of this approach is the circular form of the top electrode (40) with diameter (5) (as opposed to the hole-patterned electrode used in the previous cases). Also, the high-resistance material and parameters of the electrode (40) are chosen such to provide (in combination with the LC layer (1) a strong electrical impedance that strongly attenuates the electric field in the layer of LC (1) and introduces strong difference between the peripheral (42) and central (43) fields. This generates spatially non uniform LC reorientation and light focusing. The control (frequency and amplitude) of such a device is very difficult and the optical losses are very high due to the top high-resistance electrode.

Figure 3:
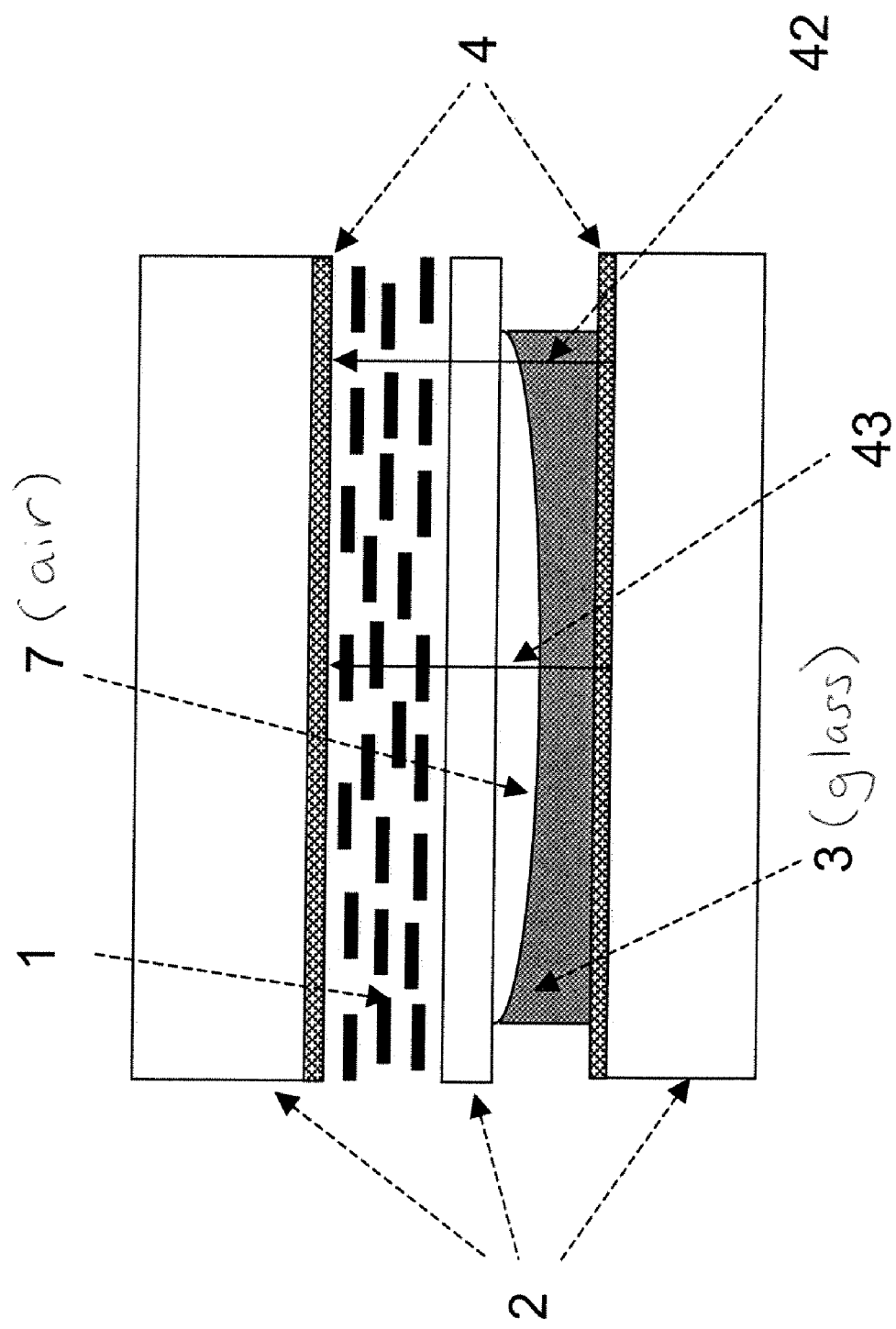
FIG. 3 schematically illustrates principal elements of a prior art tunable lens using uniform LC layer and uniform electrodes, but a non uniform intermediate object (between electrodes) to create a gradient of low frequency dielectric permittivity.

Referring to FIG. 3, we show a prior art lens, where a tunable lens is presented using uniform LC layer (1) and uniform electrodes (4) deposed on the top and bottom substrates (2). There is an intermediate lens-like glass structure (3) and free space with air (7), which is separated from the LC layer (1) by the intermediate substrate (2). The application of the voltage between uniform electrodes (4) generates electric fields that are different at the periphery (42) and at the central part (43) of the device, generating thus the non uniform director reorientation and light focusing.

There are several drawbacks of this approach. First of all it is the lensing effect when there is an unexpected failure of electric voltage applied ("action-at-0-voltage"). This is related to the unavoidable contrast between the glass lens (3) and air (7), which is required to generate the non-uniform electric field in the LC layer (1).

The second drawback of this approach is Fresnel reflection loss. This requires the use of antireflection coatings on the top surface of the layer (3) and of the bottom surface of the intermediate substrate (2), which however would increase the production cost.

The third drawback of this approach is the limited spatial modulation of the electric field. This is because glass/air dielectric constants' ratio is rather limited (typically $\in^{(g)}_{DC}/\in^{(a)}_{DC} < 8$). Thus, to obtain strong spatial modulation of electric field the profile of the glass (3) must be strongly curved, which makes even worse the first problem.

In some embodiments, we propose a combination of materials that allows us to obtain a device without the above-mentioned three drawbacks. To succeed, we use the fundamental property of the dependence of material dielectric permittivity $\in$ upon the frequency of electric field v.

Let us first analyze the operation of the previous prior art lens and also the origins of drawbacks of this approach. The non-uniform electric field is obtained there thanks to the difference ($\in^{(g)}_{DC} \neq \in^{(a)}_{DC}$) of dielectric permittivity of glass and air at low frequency electric field (v≈0.5-100 kHz, denoted by the index "DC"). The third drawback of the previous approach is in fact the relatively small ratio $\in^{(g)}_{DC}/\in^{(a)}_{DC}$ (at low driving frequencies). At the same time, the first and second drawbacks of the previous approach originate from the fact that the dielectric susceptibilities of glass and air at high (optical) frequencies (simply denoted as $\in^{(g)}_{opt}$) and $\in^{(a)}_{opt}$) are quite different.

However, the dependence $\in(v)$ may have different forms depending upon the character of the material (dielectric, semiconductor, metals) and its geometrical form. We propose thus to find a combination of materials (3) and (7) to resolve all three drawbacks mentioned above.

Figure 4A:
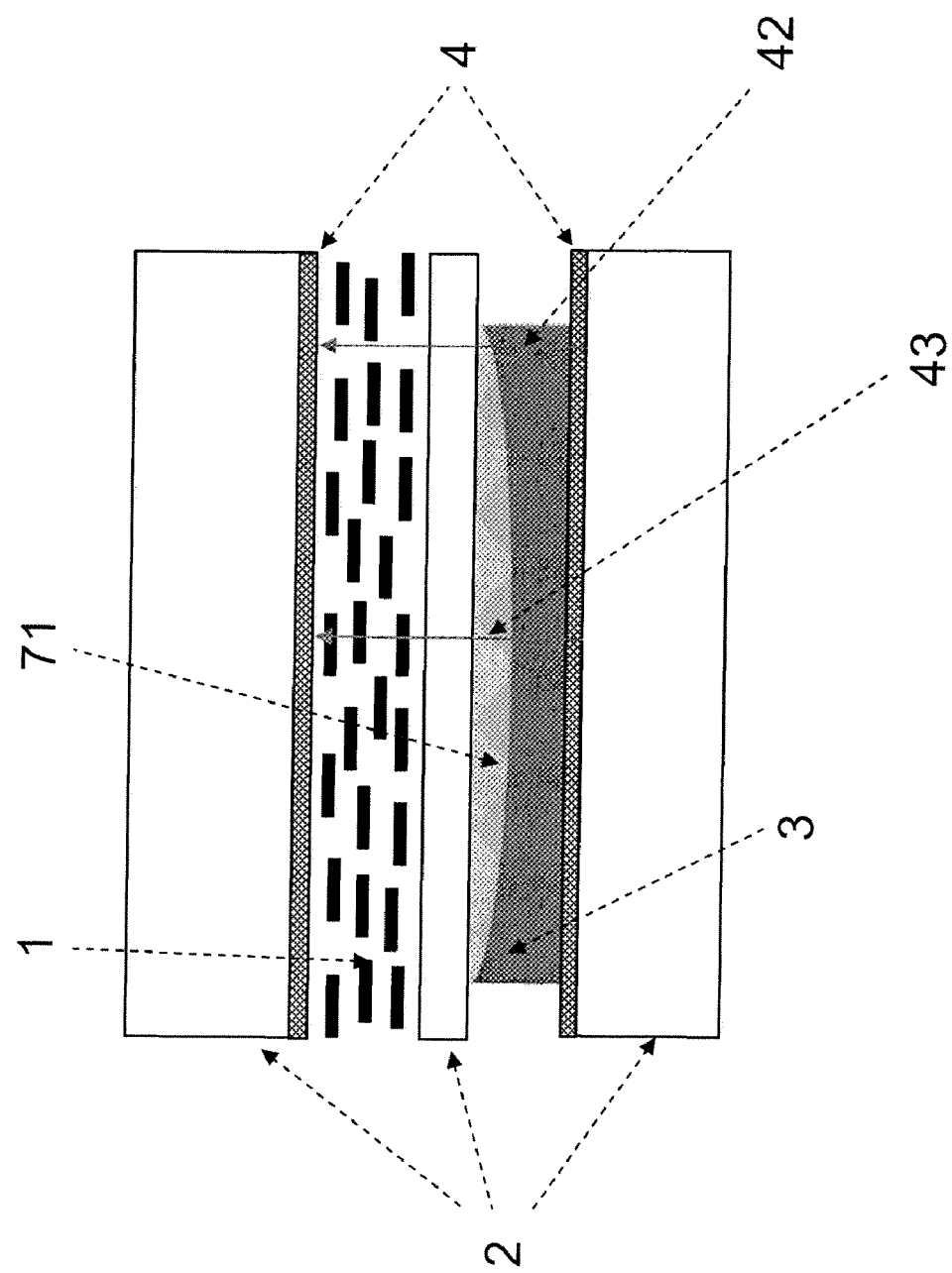
FIG. 4A schematically illustrates principal elements of the hidden structure (a) that allows the generation of spatially non-uniform electric field and a tunable lens (b) using uniform LC layers and uniform electrodes allowing high-efficiency, "no-action-at-0-voltage" and low-loss operation.

Thus, in the first embodiment of the present invention, as shown in the FIG. 4A, we propose (and implement our proposition in experiment, see later) a hidden structure, which is optically uniform, but is strongly non uniform for lower frequency electric field used to drive LC orientation. In fact the material 3 and 71 are specifically chosen to allow strong focusing when inserted between two uniform electrodes 4 (FIG. 4A) of various electrical potential, while having no focusing properties without electric voltage. The effect of using the hidden structure of FIG. 4A is to fill the remaining air space (between the LC cell and the intermediate glass (3) of the FIG. 4A) by a specific material (71). An example of such a material may be a water based solution with a specific low-frequency dielectric permittivity $\in^{(s)}_{DC}$ and high (optical) frequency dielectric permittivity $\in^{(s)}_{opt}$ (let us recall that the optical refractive index $n_s$ of this material is defined as $n_s = [\in^{(s)}_{opt}]^{0.5}$). Due to the very unique dipolar molecular character, water has a huge $\in^{(s)}_{DC}$ (at the order of 78) and, in the meantime, it has very low $n_s$ (at the order of 1.3).

Thus, we can resolve all three problems by using (as element (71)) a combination of a water-based solution (with $\in^{(s)}_{DC} \approx 78$ and $n_s \approx 1.3$) and an intermediate material (3) having very low optical refractive index $n^{(3)}$ and $\in^{(3)}_{DC}$. An example of such material may be the fluorinated polymer (typically having very low values of $n_{pol} \approx 1.3$ and $\in^{(3)}_{DC} \sim 3$). Thus, at optical frequencies there will be a planar uniformity and no-lensing-at-0-voltage since the structure (3) will be "hidden" for optical waves ($n_{pol} \approx n_s$). In addition there will be no additional Fresnel reflections and optical losses ($n_{pol} \approx n_s$). In the meantime, there will be an extra-ordinarily large contrast of dielectric permittivity at low frequency fields $\in^{(s)}_{DC} - \in^{(pol)}_{DC} \approx 75$ (as opposed to the previous case of $\in^{(g)}_{DC} - \in^{(a)}_{DC} \approx 5.53$. This contrast will allow the easy generation of spatially non-uniform electric field and reorientation of LC director that is required to focus optical waves when it is needed only.

It will be appreciated that water is only one example of a liquid yielding a high low frequency dielectric constant. Polar liquids and gels in general have high dielectric values. Glycerol has been found to be desirable since it is transparent in the visible spectrum, and it remains a liquid across a wide temperature range while having a desirable index of refraction value.

In some embodiments, lensing at zero voltage is desirable and $n_{pol} \neq n_s$. For example, a fixed lens that is part of imaging optics can be provided by the combination of (3) and (71). In such a case, it may be also possible to integrate the structure (3) into the intermediate glass layer (2).

Figure 4B:
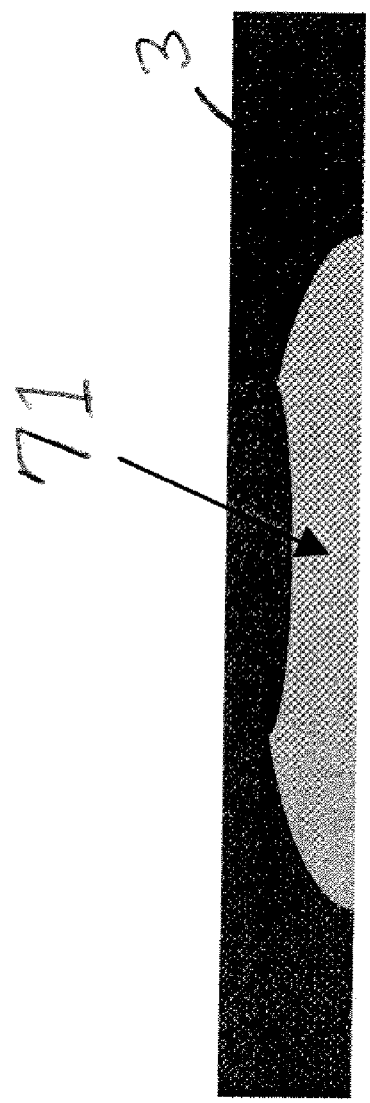
FIG. 4B illustrates a hidden layer that is of complex, aspherical shape.
Figure 4D:
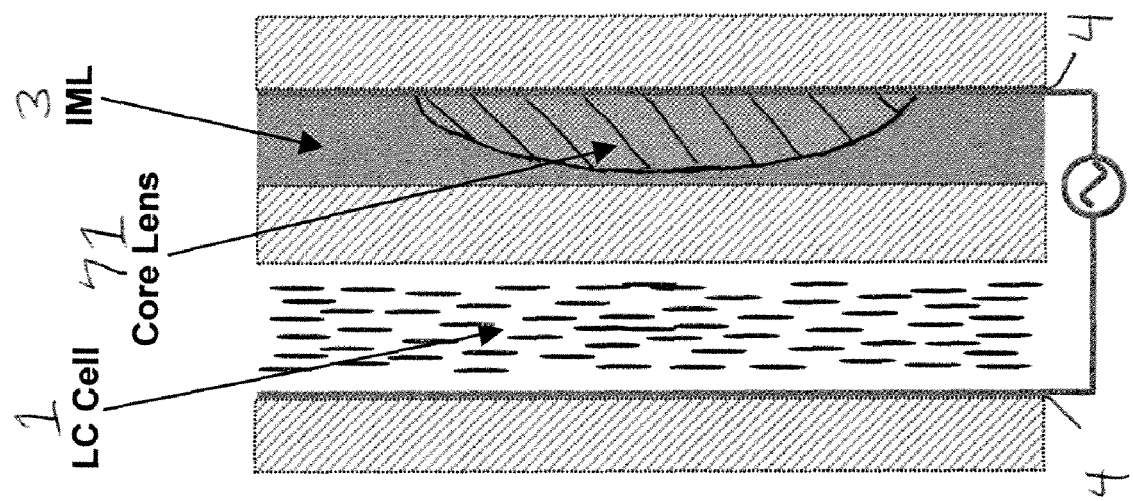
FIG. 4D illustrates a variable focus liquid crystal lens having an electric field modulation layer with a core lens structure and surrounding liquid that leads to an orientation of the electric field lines away from a middle of the lens.
Figure 4C:
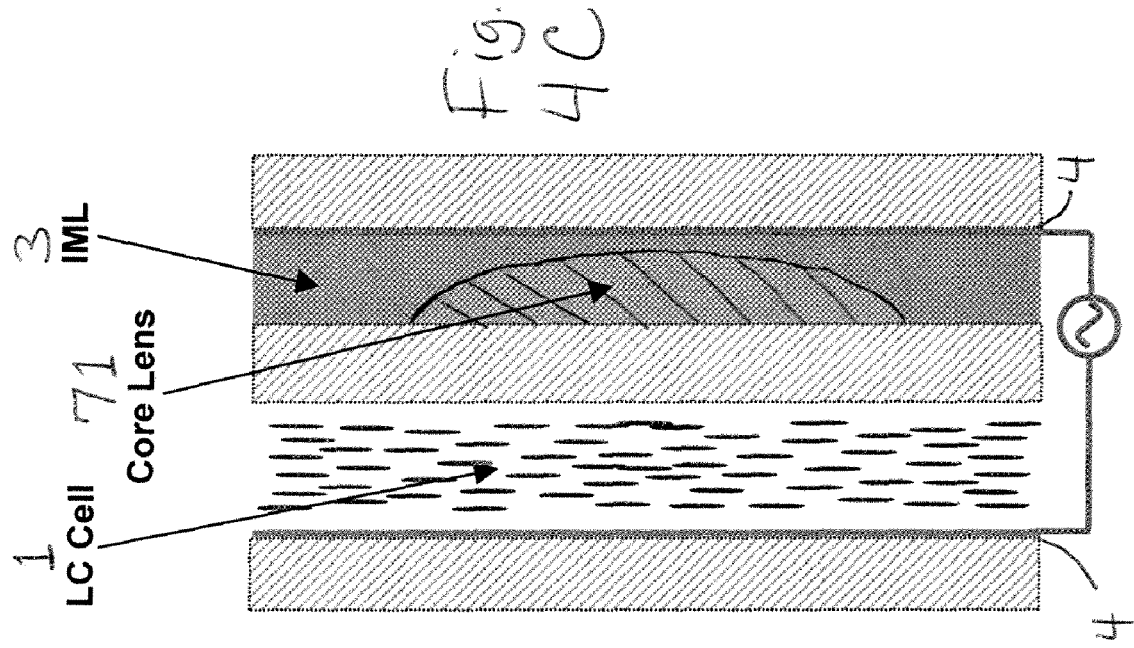
FIG. 4C illustrates a variable focus liquid crystal lens having an electric field modulation layer with a core lens structure and surrounding liquid that leads to an orientation of the electric field lines towards a middle of the lens.

In some embodiments, the electric field may be suitably modulated in intensity and orientation by design of the electric field modulation layer (3,71). FIG. 4B illustrates a hidden layer that is of complex, aspherical shape. In FIG. 4C, a variable focus liquid crystal lens has an electric field modulation layer with a core lens structure and surrounding liquid that, due to the low permittivity of 71 and the high permittivity of 3, leads to an orientation of the electric field lines towards a middle of the lens. While in FIG. 4D, the variable focus liquid crystal lens has an electric field modulation layer with a core lens structure and surrounding liquid that, due to the low permittivity of 71 and the high permittivity of 3, leads to an orientation of the electric field lines away from a middle of the lens. It will be appreciated that if the permittivity of 71 were much greater than the permittivity of 3, then the overall profile of the electric will be better in the embodiment of FIG. 4D, just as it is in FIG. 4C.

Figure 5:
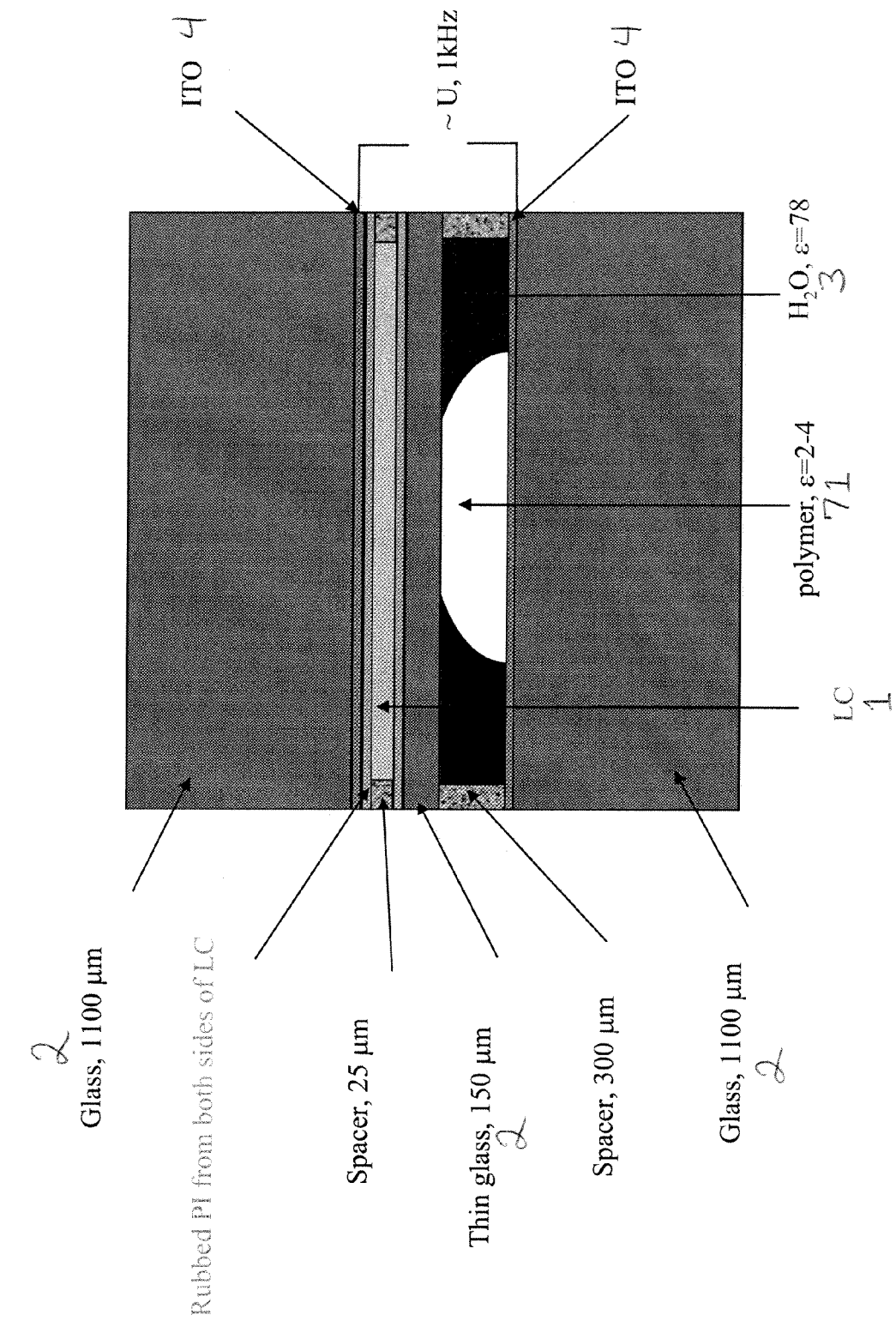
FIG. 5 illustrates principal elements of an experimental sample built to demonstrate the tunable lens shown in FIG. 4.

Referring to FIG. 5, we show a concrete example of such a tunable lens, which is built following the above-mentioned approach and using water as material (71) and the polymer may be a fluorinated polymer or any other kind of material matching the refractive index of the liquid and having a strong difference of low frequency dielectric constant as element (3).

The planar construction of FIG. 5 is an advantage for many reasons. The flat transparent plates containing the liquid crystal and making up the liquid crystal layer are simple to prepare to receive the liquid crystal, as is known in the art. Since the liquid crystal responds to the electric field, and the electric field is greater when the distance between the electrodes is smaller, the flat geometry may be useful in keeping the construction compact. In some embodiments, one of the transparent plates can be integrated with a component of the adjacent electric field modulation layer.

While having a "hidden structure", namely an electric field modulation layer (3,71) that provides an optical index of refraction that is essentially spatially uniform within an image forming portion of the optical device, is desirable in many cases, it will be appreciated that it can also be advantageous to have the electric field modulation layer provide some level of static control of the propagation of light, for example some focusing power in a lens system. In these cases, there may be an index of refraction difference between two materials that together form the electric field modulation layer, or a single material that has some optical property or effect that is combined into the optical system.

In the case of a single material that is a polar liquid or gel, the liquid or gel is encapsulated in an optical envelope. For example, a blister of glycerol could provide the desired shaping of the electric field, and its optical effects on forming an image could be compensated/integrated into the whole lens system, namely the other lens components could complement the blister's optical imaging effect to provide a correct image in the image plane.

There exist also other types of solid material that can be exploited for modulating the electric field. There are known various high electric permittivity ceramic materials, such as perovskites (Barium Strontium Titanate), materials based on $(Ba, Sr)TiO_3$ or on $CaCu_3Ti_4O_{12}$ or (Li, Ti)-doped NiO or thin films of $Ca_{1-x}La_xMnO_3$ ($x \leq 0.03$) or polymer-ceramic nano-composites, etc. that have low frequency permittivity values of $10^3$ to $10^6$. Such materials may be used alone as a solid body, or as an additive to transparent plastics, gels or liquids to achieve desired high electric permittivity materials. When used alone, the thickness required to achieve significant modulation of the electric field is minimal, and thus the focusing (or aberration) effect can be minimal or negligible.

Figure 6A:
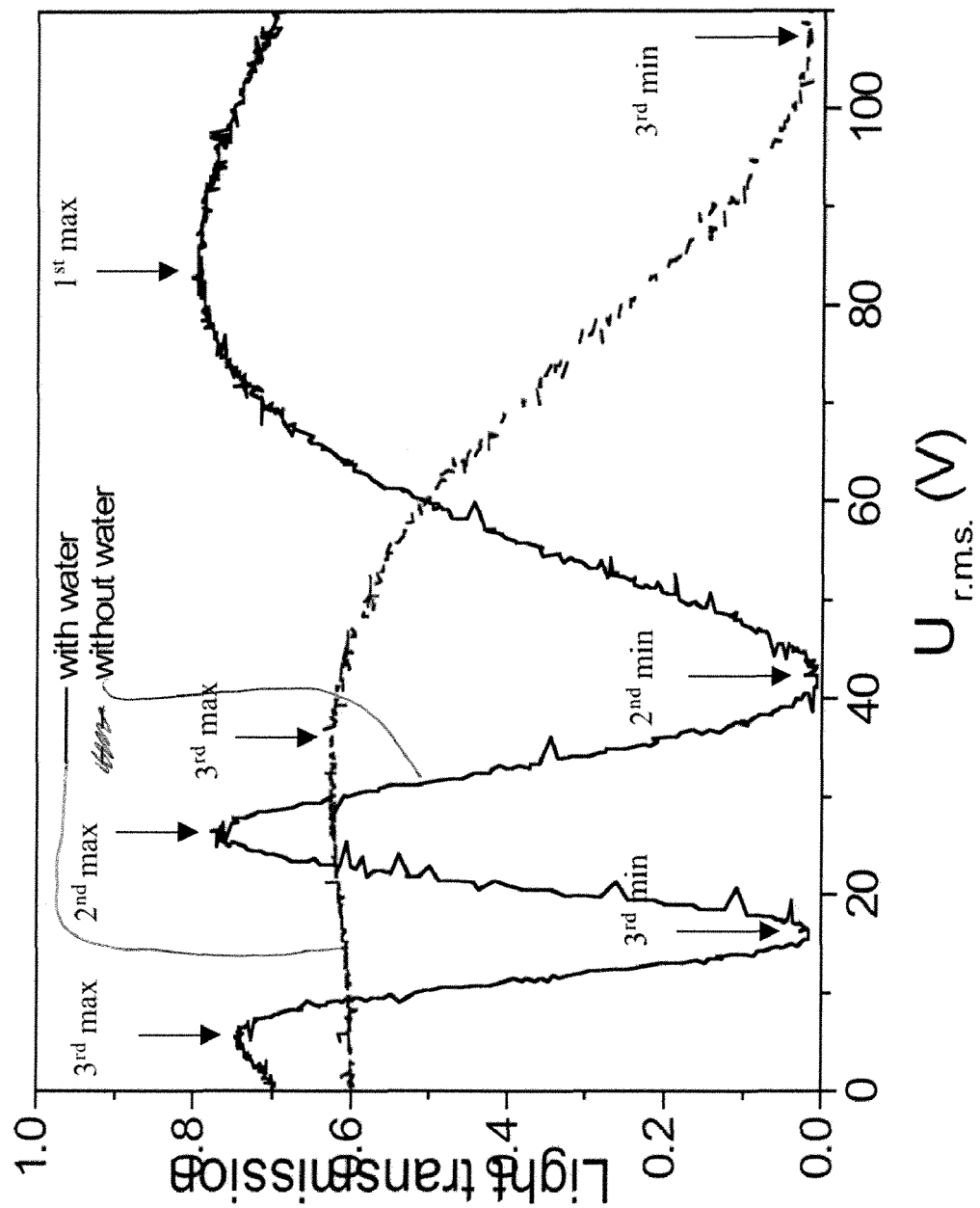
FIG. 6A illustrates the experimentally obtained spatially non-uniform delay of molecular reorientation using the sample of FIG. 5.

FIG. 6A shows the experimental data obtained by using the above-mentioned lens. The tunable lens is placed (with a director oriented at 45 degrees) between crossed polarizer and analyzer, which are oriented in vertical and horizontal directions, respectively. The application of the uniform voltage creates a spatially non-uniform electric field in the LC layer, generating thus a corresponding director reorientation. This reorientation is detected by a probe beam (of small diameter) that is testing the reorientation in the central part of the lens (denoted as "without water", dashed curve, FIG. 6A) and then at the peripheral part (denoted as "with water", solid curve, FIG. 6A). As it can be seen, the reorientation of LC is strongly non-uniform in space.

Figure 6B:
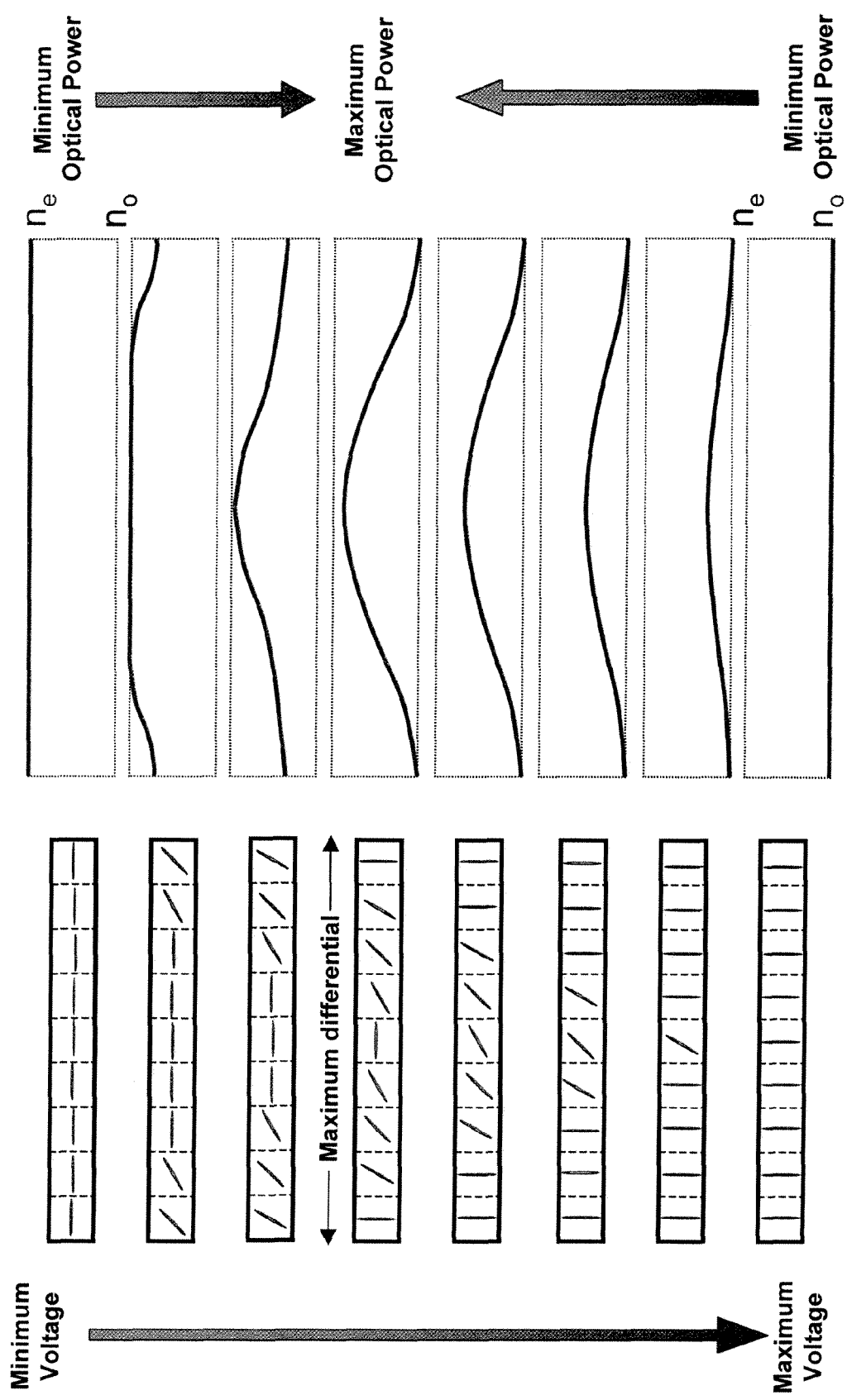
FIG. 6B illustrates schematically the change in liquid crystal orientation as a function of voltage leading to a corresponding change in optical power.

FIG. 6B shows the effect of the electric field variation on the orientation of the liquid crystal, and the resulting effect on optical power in the case of a variable focus lens. As can be seen, the electric field causes a spatially variable change in the orientation over the image-forming portion of the lens as the voltage is increased from zero. However, at a certain voltage, full change in orientation of the liquid crystal is achieved in the central portion of the lens and further increase in the voltage merely causes a saturation, and as the voltage continues to rise, the lens is eventually lost as the whole image forming portion reaches the full change in orientation and thus the same value for the index of refraction. Graphically, the optical power plotted as function of voltage is illustrated in FIG. 6C.

The circularly symmetric character of the obtained LC reorientation is demonstrated in the FIG. 7, where the ring structure dependence upon the applied voltage is presented. Each ring corresponds to a $2\pi$ differential phase shift between ordinary "o" and extraordinary "e" waves propagating in the LC layer. Thus the evolution of rings with the voltage shows the evolution of the effective spatial curvature of extraordinary refractive index $n_e$ of the LC layer.

Figure 8:
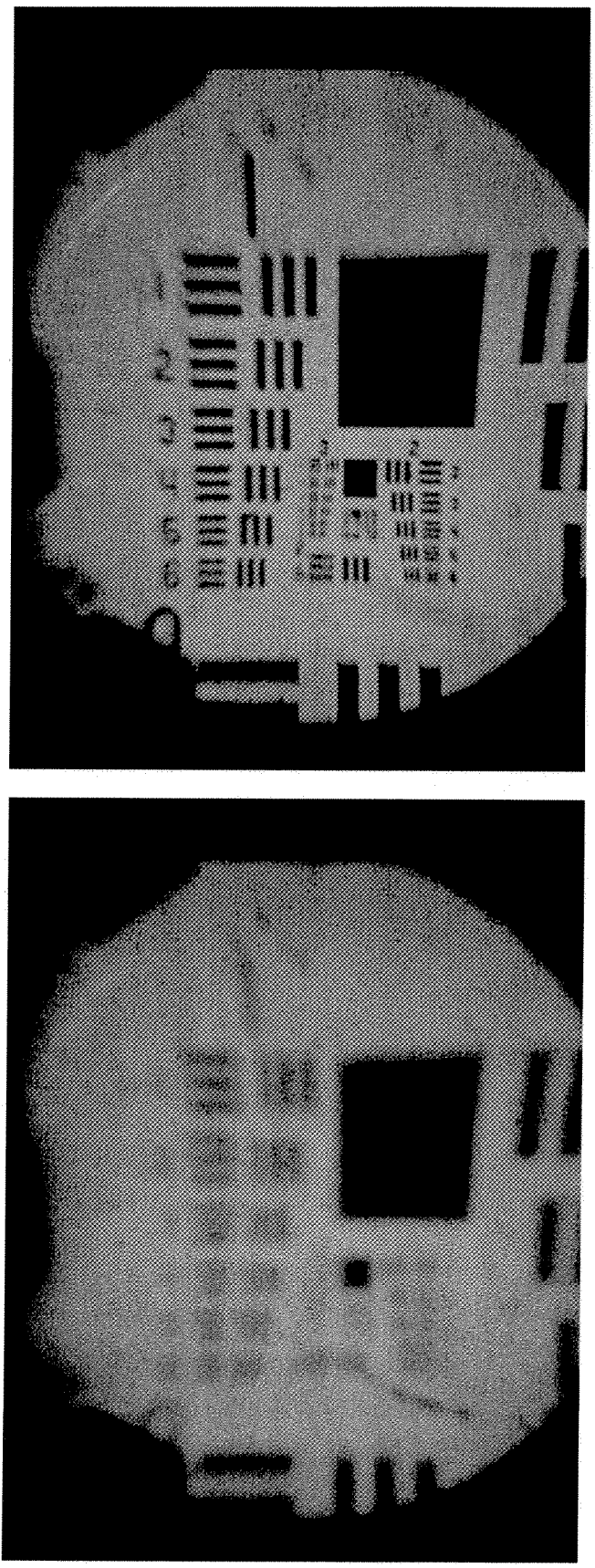
FIG. 8 illustrates the photography of experimentally obtained shift of the image plane using the sample of FIG. 5.

The FIG. 8 shows the electrically tunable shift of the image plane. The optical system is composed of a collimated white light, a fixed lens and the tunable lens of the FIG. 5.

Figure 9:
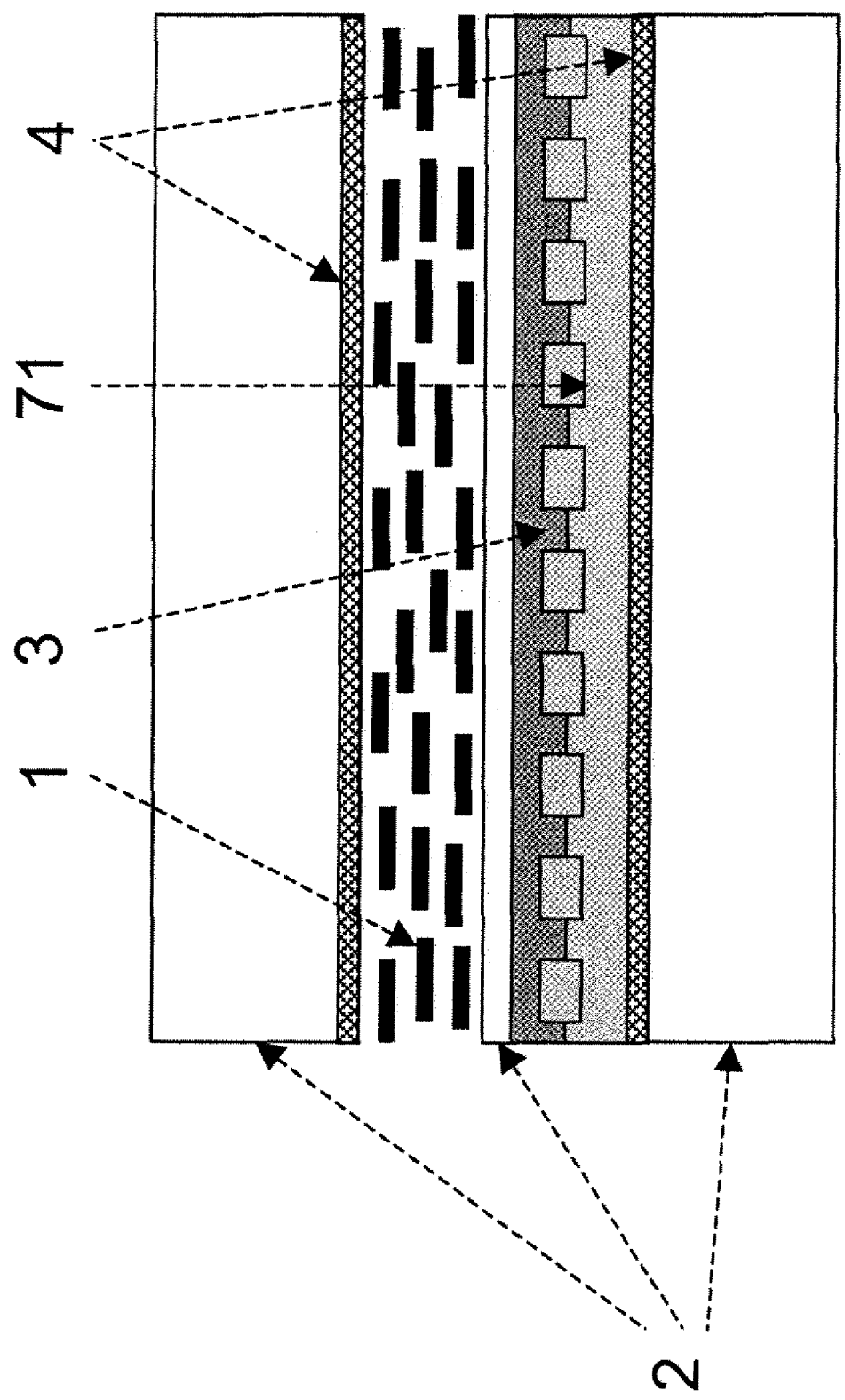
FIG. 9 schematically illustrates principal elements of a tunable diffractive lens using uniform LC layer and uniform electrodes, but a diffractive intermediate object.

In another embodiment of the present invention, referring to FIG. 9, we schematically show a tunable diffractive structure using the basic principle proposed in the present invention, which consists of a combination of two material systems, one (3) with a specific geometrical form and the other (71) embracing the first one. In the present case, the element 3 has a spatially periodic form. It can be of planar-periodic or circularly-periodic forms, providing for example, a switchable Fresnel lens operation. The application of a uniform voltage to the pair of uniform electrodes (4) will generate a periodically modulated electric field in the LC layer (1). This generates a periodically modulated director reorientation and formation of a diffractive structure.

In one embodiment of the present invention the diffractive structure may have symmetrical sine, square or triangular cross section, as well as asymmetrical (e.g., tilted and asymmetrical, such as "blazed" gratings) cross sections to provide an asymmetrical diffraction pattern.

Figure 10:
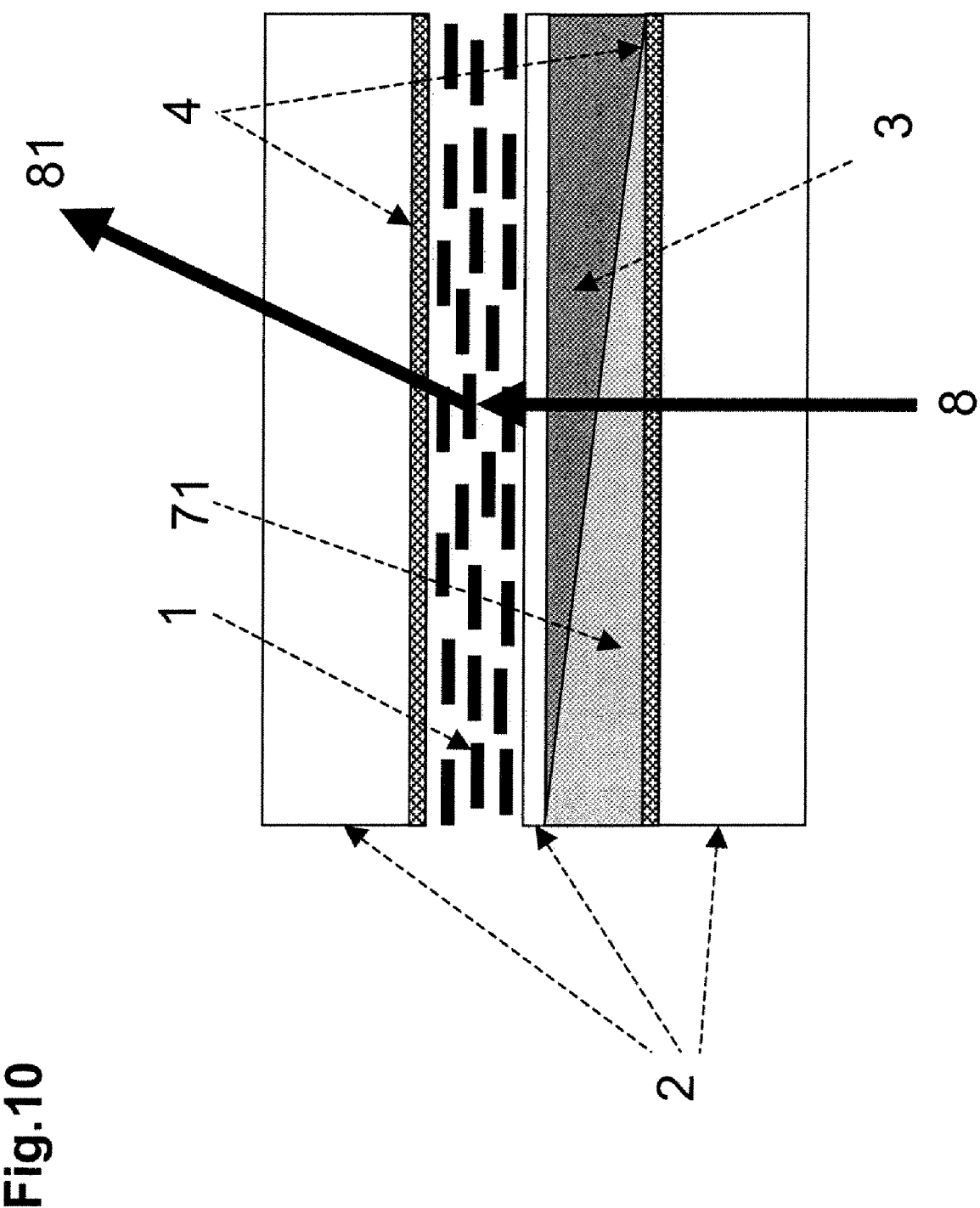
FIG. 10 schematically illustrates principal elements of a tunable beam-steering device using uniform LC layer and uniform electrodes, but a non uniform intermediate object.

In another embodiment of the present invention, referring on the FIG. 10, the intermediate structure (3) may have a spatially non-uniform, asymmetrical but non-periodic form, such as linearly or nonlinearly changing thickness (e.g., a wedge). In this case, the application of the uniform voltage to the electrodes (4) will generate a spatially non-uniform electric field (affected by the geometrical form of the structure (3)), which will generate a corresponding refractive index variation in the space. This will provide an electrically variable light propagation. In the case of a wedge structure, the application of the voltage will generate a spatially changing refractive index modulation of the LC layer (1), which will allow obtaining a tunable wedge and correspondingly a tunable beam deviation (steering). In this way, the beam (8) will be deviated into beam (81) depending upon the voltage applied.

Figure 11:
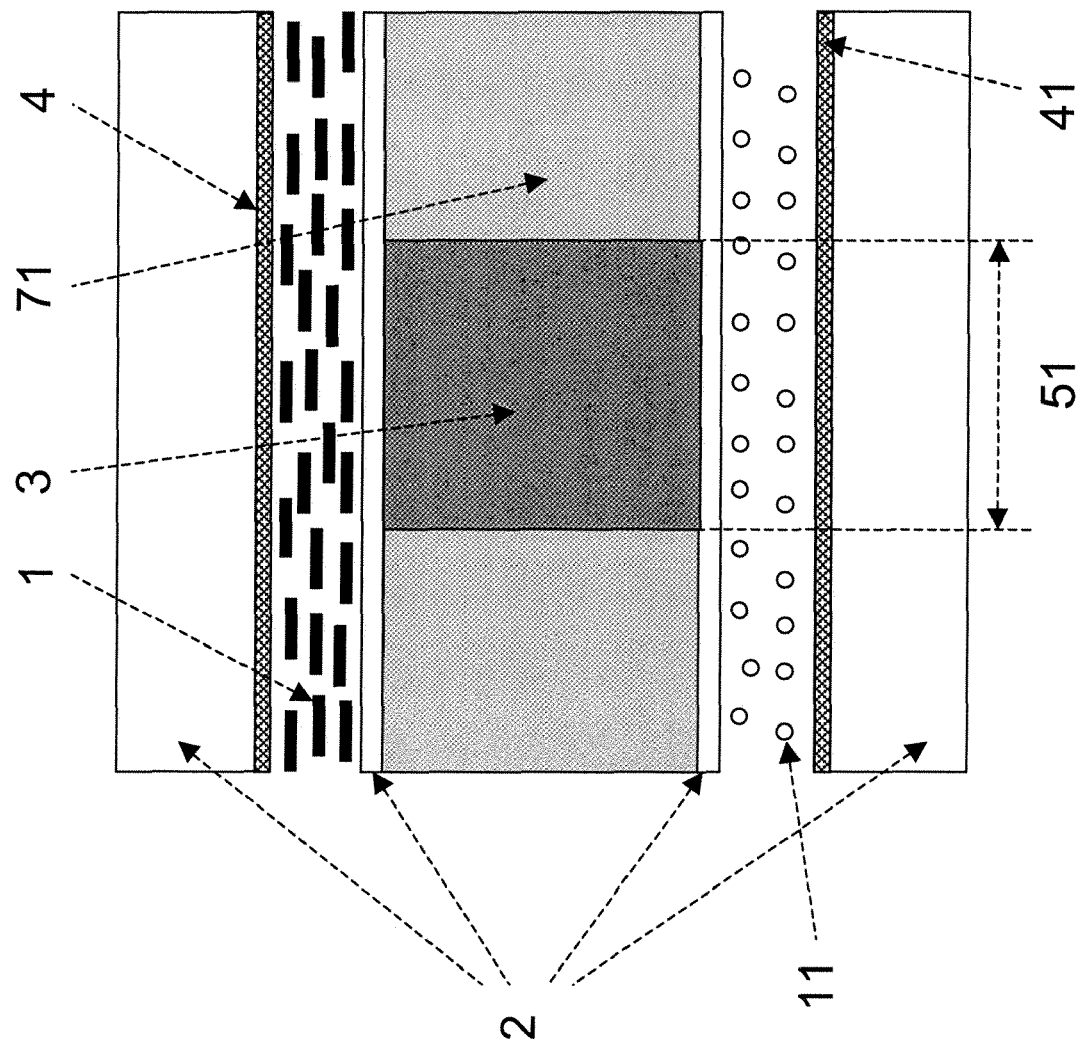
FIG. 11 schematically illustrates principal elements of a polarization insensitive tunable lens using two uniform LC layers and an intermediate non-uniform elements placed between uniform electrodes.

Still in another embodiment of the present invention, referring on the FIG. 11, the same principle of combination of two elements (3)+(71) may be used to obtain also polarization independent devices. Thus, another LC layer (11) may be used in addition to the first LC layer (1), in such a way to have directors of those layers crossed (for example, the director of the layer (1) is in the plane of the figure, while the director of the layer (11) is perpendicular to that plane). The combined structure is inserted between those two layers (1) and (11). During the manufacturing, it may be simply sandwiched between two LC cells, which have only one electrode each; for example, only one electrode (4) deposed on the bottom of top substrate of the higher cell, and another electrode (41) on the top of the bottom substrate of the lower cell. The form (schematically presented as (51)) of the structure (3) may be spatially non-uniform, symmetric, periodic, etc. In this way, the application of the voltage between the electrodes (4) and (41) will generate a spatially non-uniform electric field (affected by the form (51)) in both higher and lower LC cells. This, in turn, will generate director reorientation and corresponding refractive index changes in both cross directions, affecting thus both optical polarizations.

In all above mentioned cases, the material compositions of the elements (3) and (71) may be chosen in a way to obtain a spatially uniform combined structure (3)+(71) for high (optical) frequency waves. The structure (3) is thus "hidden" in this case. Obviously, the rest of the device (glass substrates (2), the LC layer (1) and electrodes (4) also may be chosen to be transversally uniform). In this case, the whole device will act as a spatially (transversally uniform and, if needed also longitudinally) uniform device without light deviation or focusing ("no-action-at-0-voltage").

At the same time, for some specific applications, the choice of material compositions and forms may be done in a way to obtain a specific optical function (lensing, diffraction, deviation, etc.) for 0-voltage case ("action-at-0-voltage"), which may then be modified by applying the electrical voltage.

Figure 12:
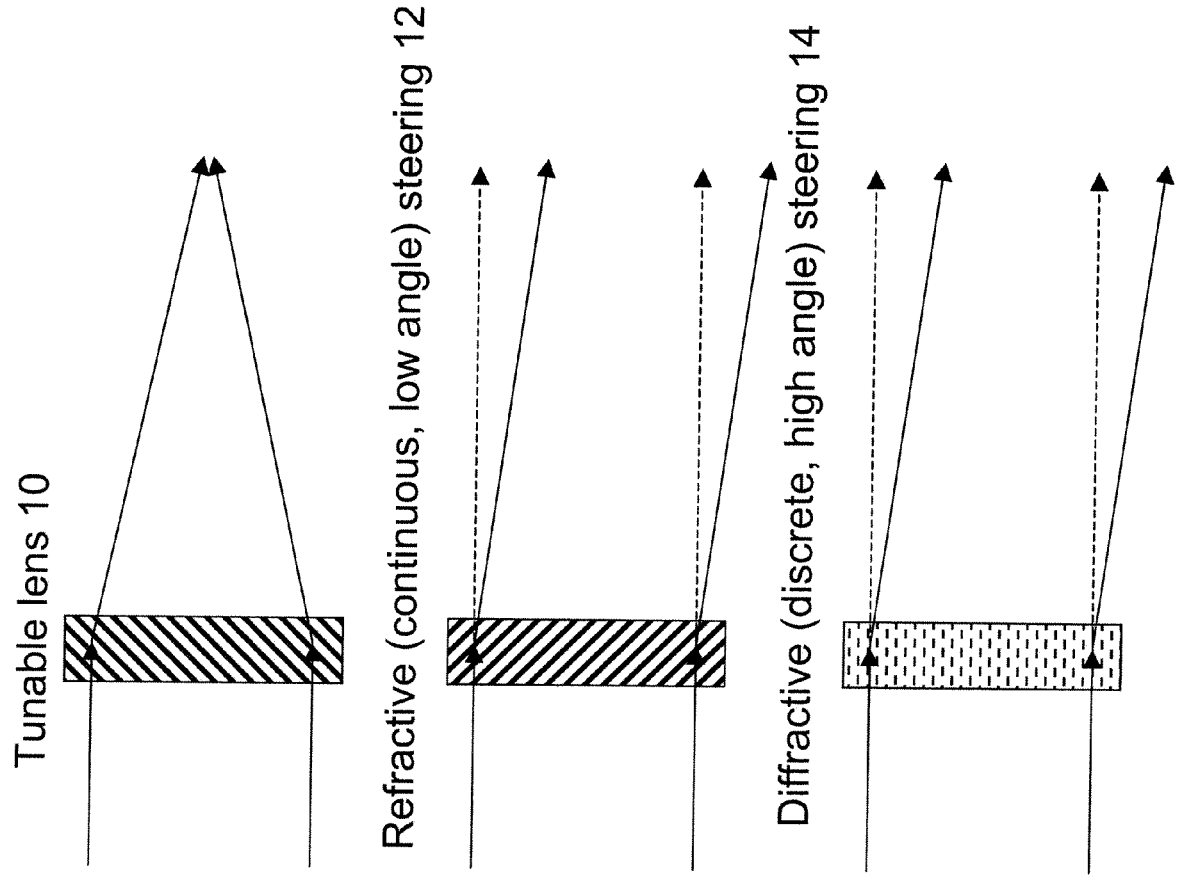
FIG. 12 illustrates schematically the principal elements of a lens system that performs both beam steering and variable focus.

FIG. 12 illustrates schematically the principal elements of a lens system that performs both beam steering and variable focus. The lens 10 is variable focus, the lens 12 is a refractive, variable steering optical device, while the lens 14 is a diffractive steering device that changes steering by a fixed angle in a single step (it is either active or inactive). It will be appreciated that a full pan, tilt and zoom (PTZ) camera lens system can be achieved by combining such tunable optical devices for the various directions and ranges desired. Diffractive devices can offer a significant change in optical power or steering angle, while refractive devices are variably tunable. Overall lens system thickness can be reduced by sharing transparent plates and/or electrodes between LC layers.

FIG. 13 shows an exploded view of a mobile or cellular telephone compact camera and lens assembly 15. The tunable LC lens 10 is integrated into the fixed lens optical system assembly. FIG. 14 shows the assembly 15 within a mobile telephone.

Only the electrical control mechanism of the presented device has been described in details. However, the same principle may be used for other excitation mechanisms also (such as magnetic, thermal, etc.) to drive the device or change its properties. For example, still in another embodiment of the present invention, heat (generated by cell electrodes or by an additional means) may be used to change the material properties of the combined structure (3)+(71), making it "hidden" or "revealed" at 0-voltage case. For example, the refractive index temperature variation coefficients dn/dT of two materials (3) and (71) may be chosen in a way that, at a given temperature $T_0$, their refractive indexes are equal $n_3 = n_{71}$, however this will not be the case for other temperatures if the condition $dn_3/dT = dn_{71}/dT$ is not satisfied. Thus, by an appropriate choice of the material we can control the hiding condition by simple heating. This could allow the creation of an additional lensing effect and, for example, controlling the aberrations of the whole lens.

It may be appreciated by the reader that various material compositions, various LC layers, various electrodes, various director alignments, various geometrical forms, etc. may be used to fabricate the same device, claimed in the present invention having as a key element the combination of elements (3) and (71), which may provide "hidden" state for optical waves and very strong dielectric permittivity contrast for low frequency electric fields.

It may be also appreciated by the reader that, various optical devices can be developed using one or more combinations of devices we have described above.

The embodiments of the invention described above are intended to be exemplary only. The scope of the invention is therefore intended to be limited solely by the scope of the appended claims.

We claim:

1. A variable optical device for controlling the propagation of light, the optical device comprising:
   a liquid crystal layer;
   electrodes arranged to generate an electric field acting on said liquid crystal layer; and
   an electric field modulation layer arranged between said electrodes and adjacent said liquid crystal layer for spatially modulating said electric field in a manner to control the propagation of light passing through said liquid crystal layer, said electric field modulation layer having an optical index of refraction that is essentially spatially uniform, and comprising a solid body having a first low frequency dielectric constant with a shape selected to impart a desired modulation of said electric field, and a second low frequency dielectric constant material surrounding or adjacent to said solid body such that said solid body and said second material form a layer geometry.

2. The device as claimed in claim 1, wherein said second material is a polar liquid or gel.

3. The device as claimed in claim 2, wherein said polar liquid or gel is glycerol.

4. The device as claimed in claim 1, wherein said liquid crystal layer has a planar geometry with two transparent plates containing liquid crystal.

5. The device as claimed in claim 2, wherein said liquid crystal layer has a planar geometry with two transparent plates containing liquid crystal.

6. A variable optical device for controlling the propagation of light, the optical device comprising:
   a liquid crystal layer;
   electrodes arranged to generate an electric field acting on said liquid crystal layer; and
   an electric field modulation layer arranged between said electrodes and adjacent said liquid crystal layer for spatially modulating said electric field in a manner to control the propagation of light passing through said liquid crystal layer, said electric field modulation layer comprising a polar liquid or gel.

7. A variable optical device for controlling the propagation of light, the optical device comprising:
   a liquid crystal layer;
   electrodes arranged to generate an electric field acting on said liquid crystal layer; and
   an electric field modulation layer arranged between said electrodes and adjacent said liquid crystal layer for spatially modulating said electric field in a manner to control the propagation of light passing through said liquid crystal layer, said electric field modulation layer comprising a very high low frequency dielectric constant material having a dielectric constant greater than 20.

8. The device as claimed in claim 7, wherein said dielectric constant is greater than 1000.

9. The device as claimed in claim 7, wherein said very high low frequency dielectric constant material is selected from the group consisting of perovskites (Barium Strontium Titanate), materials based on (Ba,Sr)TiO.sub.3, materials based on $CaCu_3Ti_4O_{12}$, materials based on (Li,Ti)-doped NiO, thin films of $Ca_{1-x}La_xMnO_3$ (x<=0.03), and polymer-ceramic nano-composites.

* * * * *